US012343747B2

(12) United States Patent
Zilai et al.

(10) Patent No.: US 12,343,747 B2
(45) Date of Patent: Jul. 1, 2025

(54) MULTI-AXIS ARTICULATING AND ROTARY SPRAY SYSTEM AND METHOD

(71) Applicant: Trinity Bay Worx, LLC, Dallas, TX (US)

(72) Inventors: Michael Shawn Zilai, Katy, TX (US); Charles Horace Camp, Katy, TX (US)

(73) Assignee: TRINITY BAY WORX, LLC, Dallas, TX (US)

( * ) Notice: Subject to any disclaimer, the term of this patent is extended or adjusted under 35 U.S.C. 154(b) by 63 days.

(21) Appl. No.: 18/317,501

(22) Filed: May 15, 2023

(65) Prior Publication Data

US 2023/0278058 A1 Sep. 7, 2023

Related U.S. Application Data

(60) Continuation of application No. 16/583,644, filed on Sep. 26, 2019, now Pat. No. 11,648,578, which is a (Continued)

(51) Int. Cl.
*B05B 3/02* (2006.01)
*B05B 13/06* (2006.01)
(Continued)

(52) U.S. Cl.
CPC ............ *B05B 13/0636* (2013.01); *B05B 3/02* (2013.01); *B05B 13/069* (2013.01); (Continued)

(58) Field of Classification Search
CPC ..... B05B 13/0636; B05B 3/02; B05B 13/069; B05B 15/652; B05B 15/68; B08B 3/02; B08B 9/0813; B08B 9/093; B08B 9/0936
See application file for complete search history.

(56) References Cited

U.S. PATENT DOCUMENTS

| | | | |
|---|---|---|---|
| 2,245,554 | A | 6/1941 | William |
| 3,420,444 | A | 1/1969 | Gunnar |

(Continued)

FOREIGN PATENT DOCUMENTS

| | | | |
|---|---|---|---|
| DE | 1961823 | A1 | 7/1970 |
| GB | 1237237 | A | 6/1971 |

(Continued)

OTHER PUBLICATIONS

Gamajet Cleaning Systems, Inc., Product Data. "GamajetIV 'GT' Tank Cleaning Machine." Gamajet Cleaning Systems, Inc., copyrighted 2002 [retrieved from the Internet on Aug. 19, 2009 using <URL:http://gamajet.com/media/images/pdf/4GTdata.pdf>].

(Continued)

*Primary Examiner* — Qingzhang Zhou

(74) *Attorney, Agent, or Firm* — Baker Botts L.L.P.

(57) ABSTRACT

The present disclosure provides a system and method articulating and rotary spray system for fluids that includes a first drive for rotating a mast for different headings and a second drive for rotating a nozzle for different pitches at any time with or without rotation of the mast. The method and system uses a system of interacting gears that rotate a control rod in variable synchronization to control the nozzle pitch relative to the mast heading while the control rod orbits about a center of rotation of the rotating mast along a longitudinal axis.

4 Claims, 21 Drawing Sheets

Related U.S. Application Data division of application No. 15/387,115, filed on Dec. 21, 2016, now Pat. No. 10,449,563.

(60) Provisional application No. 62/271,098, filed on Dec. 22, 2015.

(51) Int. Cl.

| | |
|---|---|
| ***B05B 15/652*** | (2018.01) |
| ***B05B 15/68*** | (2018.01) |
| ***B08B 3/02*** | (2006.01) |
| ***B08B 9/08*** | (2006.01) |
| ***B08B 9/093*** | (2006.01) |

(52) U.S. Cl.

CPC ............ *B05B 15/652* (2018.02); *B05B 15/68* (2018.02); *B08B 3/02* (2013.01); *B08B 9/0813* (2013.01); *B08B 9/093* (2013.01); *B08B 9/0936* (2013.01)

(56) References Cited

U.S. PATENT DOCUMENTS

| | | | | | |
|---|---|---|---|---|---|
| 3,601,136 | A | | 8/1971 | Marcham | |
| 3,874,594 | A | | 4/1975 | Hatley | |
| 3,931,930 | A | | 1/1976 | Waldrum | |
| 4,056,227 | A | | 11/1977 | Fismen | |
| 5,020,556 | A | * | 6/1991 | Lamminen | B60S 3/04 134/102.1 |
| 5,217,166 | A | | 6/1993 | Schulze et al. | |
| 5,395,053 | A | | 3/1995 | Frech | |
| 5,715,852 | A | | 2/1998 | Jepsen | |
| 5,896,871 | A | | 4/1999 | Larsen | |
| RE36,465 | E | | 12/1999 | Boisture | |
| RE36,565 | E | | 2/2000 | Burgoon et al. | |
| 6,039,056 | A | | 3/2000 | Verbeek | |
| 6,422,480 | B1 | | 7/2002 | Richmond | |
| 6,561,199 | B2 | | 5/2003 | Gleeson et al. | |
| 6,640,817 | B2 | | 11/2003 | Harmon | |
| 7,300,000 | B2 | | 11/2007 | Kitamura et al. | |
| 8,181,890 | B2 | | 5/2012 | Zilai et al. | |
| 8,402,911 | B1 | * | 3/2013 | Weisenberg | B05B 13/0636 427/236 |
| 2004/0089329 | A1 | * | 5/2004 | Bijster | B05B 3/02 134/167 R |
| 2006/0065760 | A1 | | 3/2006 | Micheli | |
| 2009/0288250 | A1 | | 11/2009 | Zhou | |
| 2011/0036381 | A1 | * | 2/2011 | Zilai | B05B 13/0636 134/168 R |
| 2015/0053241 | A1 | * | 2/2015 | Jensen | B08B 9/0813 134/167 R |
| 2017/0156557 | A1 | * | 6/2017 | Fujita | B08B 1/34 |

FOREIGN PATENT DOCUMENTS

| | | | | | |
|---|---|---|---|---|---|
| GB | 2028113 | A | | 3/1980 | |
| WO | 0247825 | A2 | | 6/2002 | |
| WO | 2004103586 | A1 | | 12/2004 | |
| WO | WO-2011001843 | A2 | * | 1/2011 | B08B 9/049 |

OTHER PUBLICATIONS

Gamajet Cleaning Systems, Inc., Product Data. "Gamajet V Tank Cleaner." Gamajet Cleaning Systems, Inc., copyrighted 2006 [retrieved from the Internet on Aug. 19, 2009 using <URL: http://gamajet.com/media/images/pdf/5data.pdf>].

Gamajet Cleaning Systems, Inc., Product Data. "Gamajet VI Tank Cleander." Gamajet Cleaning Systems, Inc., copyrighted 2007 [retrieved from the Internet on Aug. 19, 2009 using <URL: http://gamajet.com/media/images/pdf/6data.pdf>].

Gamajet Cleaning Systems, Inc., Product Data. "Gamajet E-Z7 Barrel Blaster." Gamajet Cleaning Systems, Inc., copyrighted 2002 [retrieved from the Internet on Aug. 19, 2009 using <URL: http://gamajet.com/media/images/pdf/7data.pdf>].

Gamajet Cleaning Systems, Inc., Product Data. "Gamajet E-Z8 Tank Cleaner." Gamajet Cleaning Systems, Inc., copyrighted 2002 [retrived from the Internet on Aug. 19, 2009 using <URL: http://gamajet.com/media/images /pdf/8data.pdf>].

Gamajet Cleaning Systems, Inc., Product Data. "Gamajet IX Tote Blaster Tank Cleaner." Gamajet Cleaning Systems, Inc., copyrighted 2003 [retrieved from the Internet on Aug. 19, 2009 using <URL: http://gamajet.com/media/images/pdf/9data.pdf>].

Gamajet Cleaning Systems, Inc., Product Data. "Gamajet X." Gamajet Cleaning Systems, Inc., copyrighted 2006 [retrieved from the Internet on Aug. 19, 2009 using <URL: http://gamajet.com/media/images/pdf/10data.pdf>].

Gamajet Cleaning Systems, Inc., Product Data. "Gamajet 88." Gamajet Cleaning Systems, Inc. copyrighted 2007 [retrieved from the Internet on Aug. 19, 2009 using , URL: http://gamajet.com/media/images/pdf/88data.pdf>].

AutoJet Technologies Products and Services. "Spray Nozzles & Accessories." AutoJet Technologies is a division of Spraying Systems Co., copyrighted 2006 [retrieved from the Internet on Aug. 19, 2009 using <URL: http://www.autojet.com/products/nozzles.asp>].

AutoJet Technologies Products and Services. "Tank Cleaning Systems." AutoJet Technologies is a division of Spraying Systems Co., copyrighted 2006 [retrieved from the Internet on Aug. 19, 2009 using , URL: http://www.autojet.com/tankwash/reference.asp>].

Oreco A/S. "The BLABO Tank Cleaning and Oil Recovery Process." Oil storage tank cleaning and oil recovery solutions, Oreco A/S, copyrighted 2005-2008 [retrieved from the Internet on Aug. 19. 2009 using <URL: http://www.oreco.com/sw6274.asp>].

AutoJet Technologies Products and Services. "AutoJet Tank Cleaning Systems." AutoJet Technologies is a division of Spraying Systems Co., copyrighted 2006 [retrieved from the Internet on Aug. 19, 2009 using <URL: http://www.autojet.com/pdf/AT157B-TankCleaning.pdf.asp>].

Oreco A/S, Brochure. "BLABO Non-man entry tank cleaning and oil recovery system." Oreco A/S, copyrighted 2007 [retrieved from the Internet on Aug. 19, 2009 using <URL: http://www.oreco.com/graphis/File/PDF/BLABO-uk.pdf>].

Gamajet Cleaning Systems, Inc., Product Data. "Gamajet Directional Unites." Gamajet Cleaning Systems, Inc., copyrighted 2007 [retrieved from the Internet on Aug. 19, 2009 using <URL: http://gamajet.com/media/images/pdf/directional--data.pdf>].

Gamajet Cleaning Systems, Inc., Product Data. "Evacu-Blast and Gameavac: Portable Barrel Cleaning Equipment for Top-Down Cleaning Convenience." Gamajet Cleaning Systems, Inc., copyrighted 2005 [retrieved from the Internet on Aug. 19, 2009 using <URL: http://gamajet.com/media/images/pdf/evacublast-gamavac.pdf>].

Oreco A/S, Brochure. "Oreco's MoClean system: Automated cleaning of oil product tanks." Copyright Oreco A/S, [retrieved from the Internet on Aug. 19, 2009 using , URL: http://www.oreco.com/graphics/File/PDF/Moclean-process-uk.pdf>].

Oreco A/S, Brochure. "SNS-200: Single Nozzle Sweeper" Copyright Oreco A/S, [retrieved from the Internet on Aug. 19, 2009 using , URL: http://www.oreco.com/graphics/File PDF/Optional-sns200-uk.pdf>].

Oreco A/S, Brochure. "TZ-68: Rotary Jet Head" Copyright Oreco A/S, [retrieved from the Internet on Aug. 19, 2009 using <URL: http://www.oreco.com/graphics/File/PDF/Press/Optional-tz68-uk.pdf>].

Appelt, L., International Search Report for International Patent Application No. PCT/US2010/042896, European Patent Office, dated Oct. 21, 2010.

Appelt, L., Written Opinion for International Patent Application No. PCT/US2010/042896, European Patent Office, dated Oct. 21, 2010.

* cited by examiner

MULTI-AXIS ARTICULATING AND ROTARY SPRAY SYSTEM AND METHOD

PRIORITY

This nonprovisional application is a continuation under 35 U.S.C. § 120 of U.S. patent application Ser. No. 16/583,644 filed on Sep. 26, 2019 which is a divisional of U.S. patent application Ser. No. 15/387,115 filed Dec. 21, 2016 and entitled "MULTI-AXIS ARTICULATING AND ROTARY SPRAY SYSTEM AND METHOD" which claims priority to U.S. Provisional Patent Application No. 62/271,098 filed Dec. 22, 2015 both of which are hereby incorporated by reference in their entirety.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

This disclosure relates a system and method of flowing fluids from a rotating opening. More specifically, the disclosure relates to a system and method for flowing fluids with an articulating and rotating spray nozzle.

Description of the Related Art

Tanks, vessels, and other surfaces routinely require cleaning and other maintenance. The challenge is to clean the surfaces of the structures sufficiently to accept the next process in minimal time and with minimal cleaning fluid. Current market trends demand minimal time and minimal expense. Current environmental trends demand minimal fluid usage. Current safety trends demand minimal entry by personnel into confined spaces. Enclosed volumes are especially challenging. The contours of the inner surfaces and restricted access of enclosed surfaces make a difficult job more demanding. Other constrained volumes include wells and pipes or tubing that may benefit from a fluid sprayed or otherwise flowed therein.

Prior efforts have attempted to solve the challenges of spraying fluids, such as for cleaning in enclosed volumes. Examples include U.S. Pat. Nos. 2,245,554, 3,420,444, 3,931,930, 4,056,227, 5,020,556, 5,217,166, 5,395,053, 5,896,871, 6,422,480, 6,561,199, 6,640,817, 7,300,000, Re. 36,465, and US Publ. No. 2006/0065760. Commercial systems are also available for review on the Internet and include: www.autojet.com/tankwash/reference.asp, www.gamajet.com/products/iv.html, and www.oreco.com/sw17371.asp. Most of the spray systems include one or more rotating nozzles about a longitudinal axis of the spray systems and many include telescoping the nozzle(s) into the enclosed volume. In some disclosures, the cleaning fluid is the driving medium for the rotation. In some disclosures, a nozzle is angularly fixed as it is rotated about the longitudinal axis within the enclosed volume. In some disclosures, the nozzles can be moved to different pitch angles and oscillate during the rotation, but are dependent on the rotation occurring to move the nozzle pitch angle. In some disclosures, the nozzle pitch angle may be independently controlled from the rotation.

A noted improvement in the technology is found in U.S. Pat. No. 8,181,890, entitled "Articulating and Rotary Cleaning Nozzle Spray System and Method" of the same inventors as the present invention. The system provides a rotating swash assembly that allows independent control of the nozzle pitch from the nozzle rotation and supplies a fluid through the same apparatus used to rotate the nozzle. Despite the significant improvement in the field, the relative complexity of the structure may limit the reduction in size for smaller volumes, and suitability for certain applications.

Therefore, there remains a need for a different control system and method for an articulating and rotary spray system for fluids.

BRIEF SUMMARY OF THE INVENTION

The present disclosure provides a system and method articulating and rotary spray system for fluids that includes a first drive for rotating a mast for different headings and a second drive for rotating a nozzle for different pitches at any time with or without rotation of the mast. The method and system uses a system of interacting gears that rotate a control rod in variable synchronization to control the nozzle pitch relative to the mast heading while the control rod orbits about a center of rotation of the rotating mast along a longitudinal axis.

The disclosure provides a multi-axis articulating and rotary spray system, comprising: a mast assembly, the mast assembly comprising: a mast shaft having a longitudinal axis which forms a center of rotation for the mast shaft, the mast shaft having a mast main port formed in the mast shaft and comprising: a nozzle union trunnion coupled with the shaft and having a fluid inlet and a fluid outlet, the fluid inlet fluidicly coupled to the mast main port; an articulating nozzle union rotatably coupled to the nozzle union trunnion, the articulating nozzle union comprising a gear circumferentially disposed around the nozzle union trunnion; and a longitudinal rod opening formed in the mast shaft radially offset from a longitudinal axis of the mast shaft, where the rod opening is configured to rotate with the mast shaft and orbit around the longitudinal axis. The rotary spray system further comprises a pitch drive rod extending at least partially into the longitudinal rod opening and rotatably coupled to the gear on the nozzle union; a pitch drive coupled to the pitch drive rod and configured to move the pitch drive rod to change a pitch of the nozzle union through the gear; and a heading drive coupled to the mast shaft and configured to rotate the mast shaft to change a heading of the mast shaft, the pitch drive being selectively synchronized to move the pitch drive rod relative to the rotation of the mast shaft as the pitch drive rod orbits about the longitudinal axis to maintain a pitch angle or to change a pitch angle of the nozzle.

The disclosure also provides a method of controlling a heading and pitch of a multi-axis articulating and rotary spray system, having a mast assembly with a rotatable mast shaft having a center of rotation along a longitudinal axis and a rotatable nozzle coupled to the mast shaft; a longitudinal rod opening formed in the mast shaft offset from the longitudinal axis; a pitch drive rod extending at least partially into the longitudinal opening and rotatably coupled to the nozzle; a mast main passage formed in the mast shaft and fluidicly coupled to the nozzle; a pitch drive coupled to the pitch drive rod and configured to move the pitch drive rod to change a pitch of the nozzle; and aa heading drive coupled to the mast shaft and configured to rotate the mast shaft to change a heading of the mast shaft, the method comprising: rotating the mast shaft with the heading drive; causing the pitch drive rod to orbit off center about the longitudinal axis with the mast shaft; and selectively actuating the pitch drive to synchronize a rotation of the pitch drive rod as the pitch drive rod orbits the longitudinal axis to determine a pitch angle of the nozzle as the nozzle rotates with the mast shaft.

The disclosure further provides a multi-axis articulating and rotary spray system, comprising: a mast assembly, the mast assembly comprising: a mast shaft having a longitudinal axis which forms a center of rotation for the mast shaft, the mast shaft having a mast main port formed in the mast shaft and comprising: a nozzle union trunnion coupled with the shaft and having a fluid inlet and a fluid outlet, the fluid inlet fluidicly coupled to the mast main port; an articulating nozzle union rotatably coupled to the nozzle union trunnion, the articulating nozzle union comprising a nozzle gear circumferentially disposed around the nozzle union trunnion; and a longitudinal rod opening formed in the mast shaft radially offset from a longitudinal axis of the mast shaft, where the rod opening is configured to rotate with the mast shaft and orbit around the longitudinal axis; and a pitch drive rod extending at least partially into the longitudinal rod opening and having a rod gear rotatably coupled to the nozzle gear on the nozzle union. The spray system further comprises: a first pitch gear disposed axially along the longitudinal axis; a pitch drive coupled to the first pitch gear; a second pitch gear rotatably coupled to the first pitch gear, the second pitch gear being fixedly coupled to the pitch drive rod, wherein the second pitch gear is radially offset with the pitch drive rod in the rod opening from the longitudinal axis of the mast shaft, the second pitch gear being further rotatably coupled with the mast shaft and configured to orbit with the pitch drive rod about the longitudinal axis; and a heading drive coupled to the mast shaft and configured to rotate the mast shaft to change a heading of the mast shaft, wherein the first pitch gear is configured to selectively rotate the second pitch gear as the second pitch gear orbits around the longitudinal axis as the mast shaft rotates about the longitudinal axis to maintain a pitch angle or to change a pitch angle of the nozzle.

The disclosure also provides a multi-axis articulating and rotary spray system, comprising: a heading drive; a pitch drive; a mast assembly coupled to the heading drive and the pitch drive, having a flexible mast shaft comprising a fluid conduit and a flexible pitch member, a plurality of housings coupled to the flexible mast shaft at intervals along the mast shaft, and a plurality of rotatable nozzles rotatably coupled to the plurality of housings and to the flexible pitch member; the heading drive rotating the mast assembly to control a heading of the nozzles, and the pitch driving moving the pitch member to control the pitch of the nozzles while the heading changes.

DETAILED DESCRIPTION

The Figures described above and the written description of exemplary structures and functions below are not presented to limit the scope of what the inventors have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location, and from time to time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Also, the use of relational terms, such as, but not limited to, "top," "bottom," "left," "right," "upper," "lower," "down," "up," "side," and like terms are used in the written description for clarity in specific reference to the Figures and are not intended to limit the scope of the invention or the appended claims. For ease of cross reference among the Figures, elements are labeled in various Figures even though the actual textual description of a given element may be detailed in some other Figure.

The present disclosure provides a system and method articulating and rotary spray system for fluids that includes a first drive for rotating a mast for different headings and a second drive for rotating a nozzle for different pitches at any time with or without rotation of the mast. The method and system uses a system of interacting gears that rotate a control rod in variable synchronization to control the nozzle pitch relative to the mast heading while the control rod orbits about a center of rotation of the rotating mast along a longitudinal axis.

Figure 1:
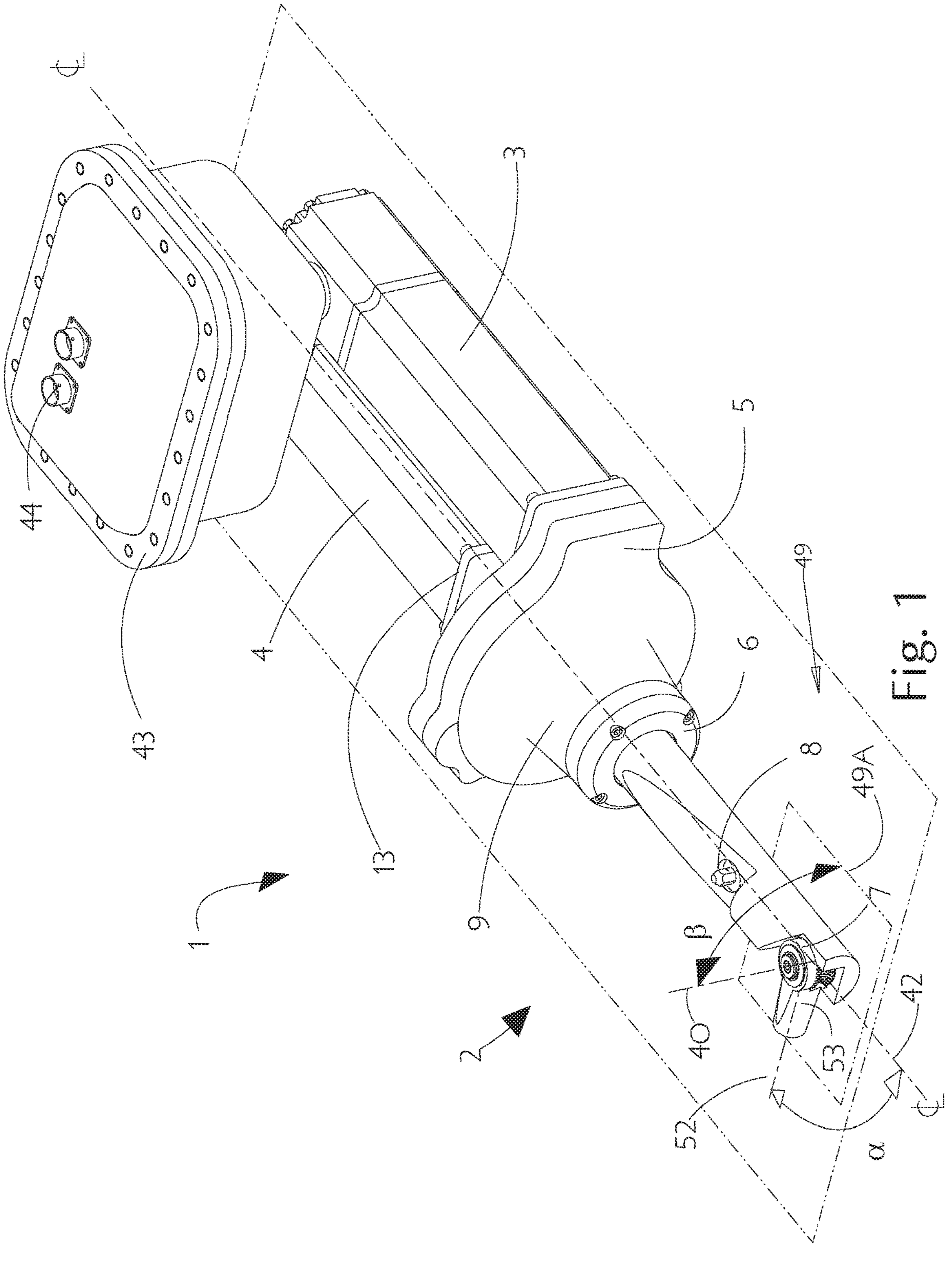
FIG. 1 is a perspective schematic view of an exemplary embodiment of a multi-axis articulating and rotary spray system.

FIG. 1 is a perspective schematic view of an exemplary embodiment of a multi-axis articulating and rotary spray system. In this embodiment, the system 1 includes a mast assembly 2 that is rotatably coupled with a pitch drive 3 and a heading drive 4. The pitch drive 3 can change a pitch angle "$\alpha$" of a nozzle 53 and the heading drive 4 can change a heading angle "$\beta$" of a mast assembly with the nozzle. The pitch drive 3 and heading drive 4 can be an integral unit or separate units that are coupled together for the system. The term "drive" is used broadly and includes any motive source that can accomplish the purposes described herein for rotating a heading of a nozzle and/or for rotating the pitch of a nozzle. For example and without limitation, a drive can include a device that can utilize electrical, pneumatic, or hydraulic power, and can be a servo, stepper or other drives and can include manual drives. In at least one embodiment, as described below, the pitch drive 3 and heading drive 4 can be coupled to the mast assembly 2 through a series of gears and housed within a gearbox housing 5. The term "gears" is used broadly, includes any rotatable means of transmitting rotational power from one rotating element to another, and includes gears, sprockets with chains, pulleys and sheaves with belts, and other rotational elements. The drives 3 and 4 can be coupled to the gearbox housing 5 through a mount 13. Further, the gearbox housing 5 can be coupled to a fluid union housing 9 with a housing cap 6 that can direct fluid into various flow passages of the mast assembly 2 described herein. A power housing 43 can be coupled to the assembly of drives and housings. The power housing 43 can include one or more power ports 44 for providing power and controls from a remove controller and power supply (not shown) to the drives 3 and 4, and any other associated sensors and power-related needs. Fluid from one or more fluid sources (not shown) can be routed through the fluid union housing 9 and out of the mast assembly 2 through one or more nozzles, such as a nozzle union 7 with a nozzle 53 or a fixed auxiliary nozzle 8. In some embodiments, a single stream from a single opening in the nozzle can be formed. In other embodiments, multiple streams can be formed in a given nozzle so that the fluid through the nozzle flows in multiple directions at a given pitch and heading.

In an advantageous embodiment, the nozzle union 7 with a nozzle centerline 52 can rotate about a nozzle axis of rotation 40 to change the pitch angle "$\alpha$" relative to the longitudinal axis 42. Further, in an exemplary embodiment, the nozzle union 7 can also rotate in heading around the longitudinal axis 42. The heading angle "$\beta$" can be referenced to a plane 49A that passes through the longitudinal axis 42 as the center of rotation of the nozzle union (and thus nozzle). Plane 49A is parallel to some datum plane 49, such as a plane that intersects the centerlines of the pitch drive and the heading drive. It is noted that other reference planes can be used that are generally fixed relative to the motion of the nozzle union in space to establish a datum for measurement of the heading angle and/or other angles. In at least one embodiment, the pitch and heading of the nozzle can be adjusted independent of the other and can both be adjusted at the same time. The term "nozzle" is used broadly herein and includes any directed flow opening for fluids. The term "spray" is used broadly herein and includes any pressurized fluid flowing out from an opening. The term "fluid" is used broadly to include any flowable or capable of transmission substances or forms, including liquids, gases, particles, fluidized solids, and electromagnetic waves.

Figure 2:
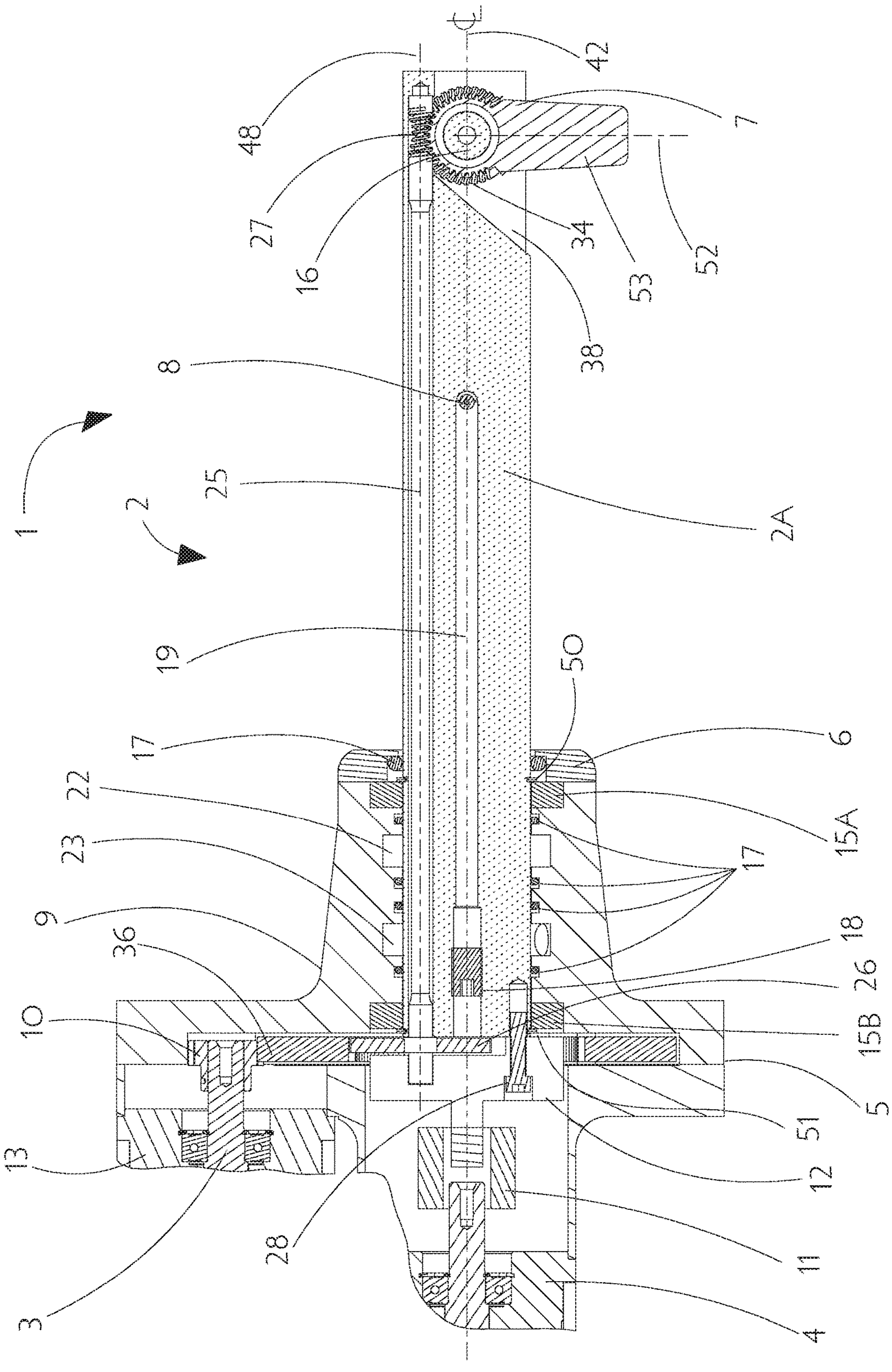
FIG. 2 is a cross sectional schematic side view of the system of FIG. 1.
Figure 6:
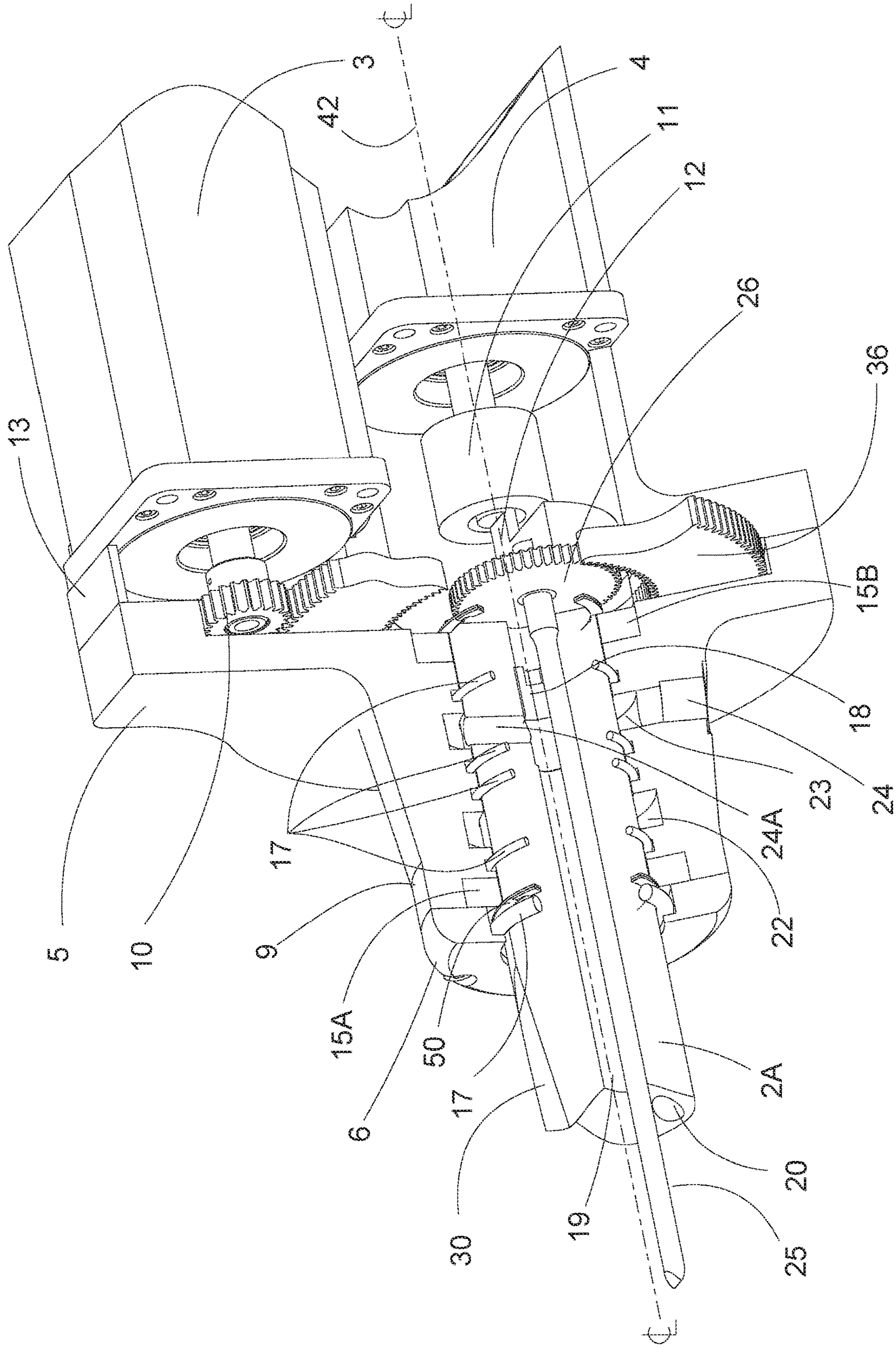
FIG. 6 is cross sectional schematic perspective view of a mast assembly and housing of the system of FIG. 2, showing fluid channels, drives, and gears as an exemplary embodiment.

FIG. 2 is a cross sectional schematic side view of the system of FIG. 1. The plane of FIG. 2 is drawn through the sectional notation shown in FIG. 3B. FIG. 6 is cross sectional schematic perspective view of a mast assembly and housing of the system of FIG. 2, showing fluid channels, drives, and gears as an exemplary embodiment. The figures will be described in conjunction with each other. The system 1 includes a pitch drive 3 and a heading drive 4 that can be collectively coupled to a drive mount 13 that in turn can be coupled to a gearbox housing 5 with gears to operate a mast assembly 2. The pitch drive 3 in the exemplary embodiment can be a motor, such as a servomotor that can be incrementally indexed and controlled with precision. The pitch drive 3 can include a drive shaft that engages a pitch drive gear 10 to transmit power through the mast assembly to the nozzle union 7. Further, the heading drive 4 can also be a motor, such as a servomotor with a drive shaft, that can be coupled with a coupler 11 to a mast drive carrier 12. The mast drive carrier 12 can be coupled in turn to the mast assembly 2, such as with a fastener 28, so that the heading drive can rotate the mast assembly 2 about a center of rotation along a longitudinal axis 42. In the preferred embodiment, the nozzle union 7 with a nozzle centerline 52 rotates about a nozzle axis of rotation 40 (shown in FIG. 1) to change a pitch angle relative to the longitudinal axis 42. Further, in an exemplary embodiment, the nozzle union 7 can rotate within a plane that is parallel to or even intersects the longitudinal axis 42 as the nozzle union changes pitch directions.

The gearbox housing 5 assists in enclosing the gears, holding any lubrication that may be useful for increasing of the life of the gears, providing recesses and mounting structure for the gears, and other functions customary in housings. The gearbox housing 5 can be coupled to a fluid union housing 9. The fluid union housing 9 includes one or more flow paths from one or more exterior fluid sources and through one more inlets described below that flow into one or more peripheral channels that are disposed between the surrounding fluid union housing 9 and the mast shaft 2A. The peripheral channels are longitudinally sealed on either side of the channel with seals 17, so that the fluid in the channel is restricted from travelling longitudinally along the mast assembly but still allows fluid in the channel to circumferentially flow into a port inlet formed through the sidewall of the mast assembly, as also described in FIG. 3. Various bearings 15A, 15B can support the mast assembly 2 within the gearbox housing 5 and/or fluid union housing 9. The bearings and seals can be held in position with bearing retainers 50 and 51. A housing cap 6 attached to the fluid union housing 9 can assist in deflecting debris from the interface of the mast shaft and the fluid union housing. In at least one embodiment, the gearbox housing 5 and the fluid union housing 9 can be an integral unit.

Figure 3:
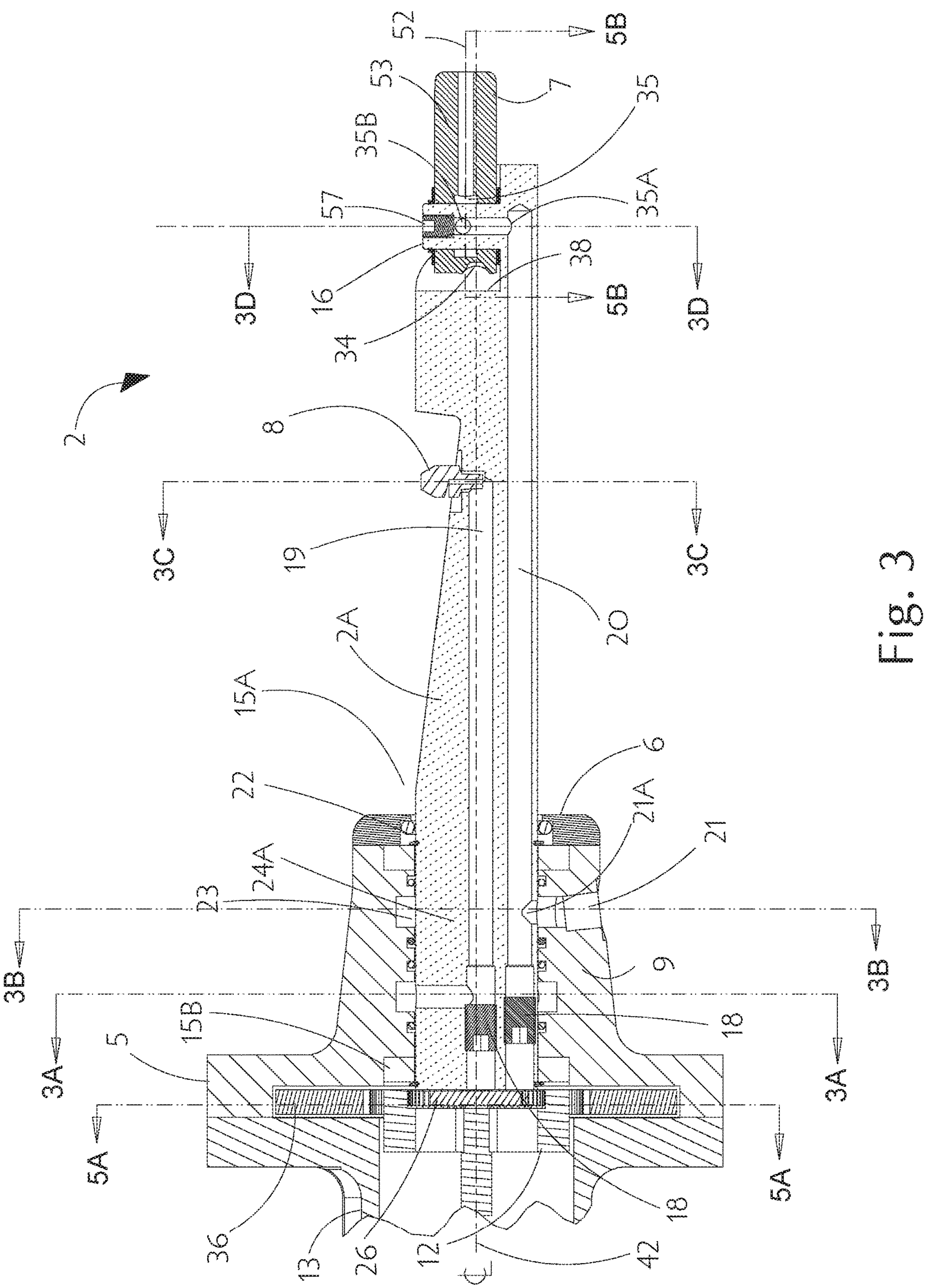
FIG. 3 is a cross sectional schematic side view of a mast assembly and housing of the system of FIG. 1 at a different angle than FIG. 2.

An exemplary embodiment of the mast assembly 2 includes a main nozzle union 7 and an auxiliary nozzle 8. The nozzle union 7 can rotate to different pitch angles relative to the longitudinal axis 42 and the auxiliary nozzle can be fixed in position. Variations can include the auxiliary nozzle being rotatable, the nozzle union 7 being fixed, and additional fixed or rotatable nozzles. At least one and advantageously two flow channels can be formed in the fluid union housing 9 for the nozzle union 7 and the auxiliary nozzle 8. A main rotary channel 22 can be formed between the fluid union housing 9 and the mast assembly 2, such as in surrounding wall of the housing 9. The main rotary channel 22 can allow fluid to flow into the mast shaft 2A for the nozzle union 7. (The flow channel for the nozzle union 7 is not shown in FIG. 2 due to the particular angle of cross-section taken in FIG. 2, but is shown in FIG. 3 as the mast main port 20.) An auxiliary rotary channel 23, as a second flow channel, can allow fluid to flow into the mast auxiliary port 19 for the fixed auxiliary angle 8.

Referencing the drive and driven elements to rotate the components, the gearbox housing 5 further can support a rotational first pitch gear 36. The first pitch gear 36 can be rotationally coupled with pitch drive gear 10 to rotate the gear 36 about an axis. Further, a second pitch gear 26 can be rotationally coupled with the first pitch gear 36 so that the first pitch gear 36 can drive the rotation of the second pitch gear 26 to also rotate. The second pitch gear 26 can be coupled to the mast drive carrier 12 in an axis 48 that is offset from the longitudinal axis 42. Further, the second pitch gear 26 can be fixedly coupled with a pitch drive rod 25 along the offset axis 48 to engage the nozzle union 7 to change the pitch of the nozzle union. In the embodiment described, the second pitch gear 26 can rotate the pitch drive rod to change the pitch. In other embodiments, the pitch drive could be coupled to the pitch drive rod to move the pitch drive rod linearly to cause the nozzle union to change pitch, such as in a rack and pinion system. Thus, in general, the pitch drive can selectively move the pitch drive rod relative to the rotation of the mast shaft to maintain a pitch angle or to change a pitch angle of the nozzle.

In some embodiments, such as those described herein with a plurality of nozzles, the invention can include the capability of a plurality of independent pitch angles for the plurality of nozzles, so that the nozzles can be directed differently from each other. For example and without limitation, multiple first pitch gears 36 and second pitch gears 26 can be stacked or otherwise assembled so that a nozzle can face a different pitch independent of another nozzle.

In operation, the invention includes synchronizing the rotation of the offset second pitch gear 26 by the pitch drive 3 changing the rotation of the pitch drive gear 10 and therefore the first pitch gear 36. As the heading drive 4 rotates the mast assembly 2, the second drive 26 orbits about the center of rotation along the longitudinal axis 42, while engaging the first pitch gear 36. By synchronizing the rotational speed of the first pitch gear 36 with the rotational speed of the mast assembly 4, the pitch drive rod 25 can be rotated to maintain or change the pitch of the nozzle union 7 as the second pitch gear 26 orbits about the center of rotation. The second pitch gear 26 can rotate at a rotational speed that maintains the pitch of a nozzle union 7 in phase with the mast assembly 2 as the mast assembly rotates with the heading drive 4. Alternatively, the relative speed of the second pitch gear 26 can be synchronized out of phase from the rotation of the mast assembly 2, so that the pitch of the nozzle union 7 changes one direction or another relative to the mast assembly 2. Further, the mast assembly 2 can be rotationally stationary and the second pitch drive 26 can rotate to change the pitch of the nozzle union 7. In each case, the speed and rotation of the second pitch gear 26 is synchronized with the mast assembly 2 rotation (or non-rotation) to achieve the desired result of a nozzle pitch angle "α" relative to a mast heading angle "β", shown in FIG. 1.

FIG. 3 is a cross sectional schematic side view of a mast assembly and housing of the system of FIG. 1 at a different angle than FIG. 2. FIG. 3 illustrates a different angle of a side cross section compared to FIG. 2 to further illustrate portions of the system described herein. The gearbox housing 5 can support various gears used in synchronizing the rotation of the mast assembly 2 to change headings with the pitch direction of the nozzle union 7 on the mast assembly. The first pitch gear 36 is used to rotate the second pitch gear 26, so that the pitch angle of the nozzle unit 7 is synchronized with the rotation of the mast assembly 2. In this particular orientation, a pitch drive gear 10 (shown in other Figures) is used to engage the first pitch gear 36. Also, in this orientation, the second pitch gear 26 appears aligned about the center of the rotation of the longitudinal axis 42 due to the particular position of the second pitch gear in its orbit path about the longitudinal axis 42.

FIG. 3 also illustrates the various flow paths between the fluid union housing 9 and the mast shaft 2A of the mast assembly 2 and within the mast shaft 2A. A mast main port inlet 21 is formed through the wall of the fluid union housing 9. The port inlet 21 fluidicly intersects the main rotary channel 22 that allows the fluid to flow around the periphery of the mast shaft 2A and into an inlet 21A formed through the wall of the mast shaft 2A regardless of the shaft heading. The inlet 21A is fluidicly coupled with a mast main port 20 that is formed longitudinally inside the mast shaft. The mast main port 20 can be formed off-center from the longitudinal axis 42. The mast main port 20 can deliver fluid to a fluid inlet 35A of an assembly termed herein a nozzle union trunnion 16. The nozzle union trunnion 16 structurally supports the nozzle union 7 and allows the nozzle union to rotate about the trunnion's circumference. A portion of the mast shaft 2A can be removed to form a nozzle relief cut away 38 to allow clearance for the nozzle union trunnion to rotate. To provide fluid from the fluid inlet 35A to the nozzle union 7, a fluid outlet 35B is formed at an angle to the inlet 35A. The inlet 35A can be plugged for manufacturing purposes with a plug 57 downstream of the outlet 35B. The outlet 35B can flow fluid into a nozzle rotary channel 35 that is formed between the trunnion 16 and the nozzle union 7. Thus, regardless of the heading of the mast assembly 2, fluid can flow from the mast main port inlet 21 into the mast main port 20. Similarly, regardless of the pitch angle of the nozzle union 7, fluid can flow from the mast main port 20 through the nozzle union 7.

In the exemplary embodiment shown, the mast assembly 2 can further include one or more auxiliary nozzles 8. The auxiliary nozzle(s) 8 can be fixed in pitch position or can have a similar assembly of components to change the pitch as described herein for the nozzle union 7. An auxiliary notary channel 23 can be formed between the circumference of the fluid unit housing 9 and the outer circumference of the mast shaft 2A. For manufacturing reasons, the channel can generally be formed in the wall of the housing 9. A mast auxiliary port inlet 24 (shown in FIGS. 3A-3D) can be formed through the wall of the fluid unit housing 9, similar to the port inlet 21. The port inlets 21 and 24 can be formed to accept a hydraulic fitting. The port inlet 24 fluidicly intersects the auxiliary rotary channel 23 that allows the fluid to flow around the periphery of the mast shaft 2A and into an inlet 24A formed through the wall of the mast shaft 2A regardless of the shaft heading. The inlet 24A is fluidicly coupled with a mast auxiliary port 19 that is formed longitudinally inside the mast shaft. The mast auxiliary port 19 can be formed off-center from the longitudinal axis 42. The mast main port 20 is fluidly coupled to the fixed auxiliary nozzle 8 to flow fluid thereto.

A drive mount 13 is also shown in FIG. 3 and is an exemplary structure to which one or more of the drives 3 and 4 can be coupled, such as the heading drive 4. The mast drive carrier 12, also described in FIG. 2, can be coupled with a coupler 11 to the heading drive 4.

Figure 3B:
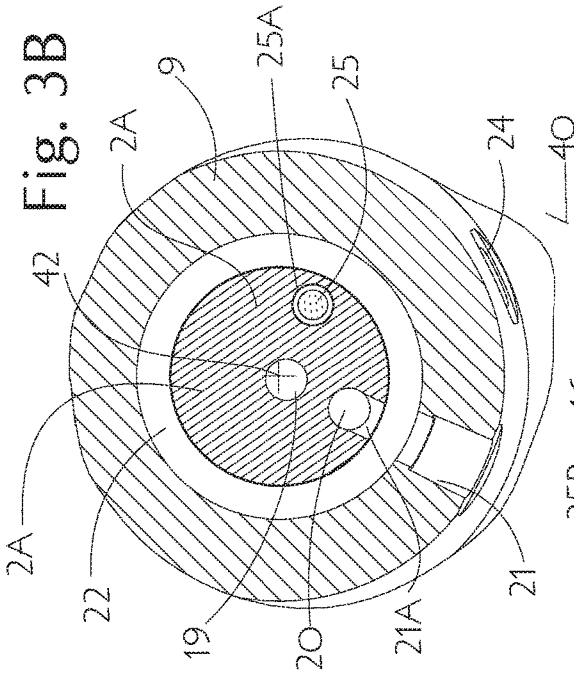
FIG. 3B is a cross sectional schematic end view across another section of the mast assembly and housing of FIG. 3.
Figure 3D:
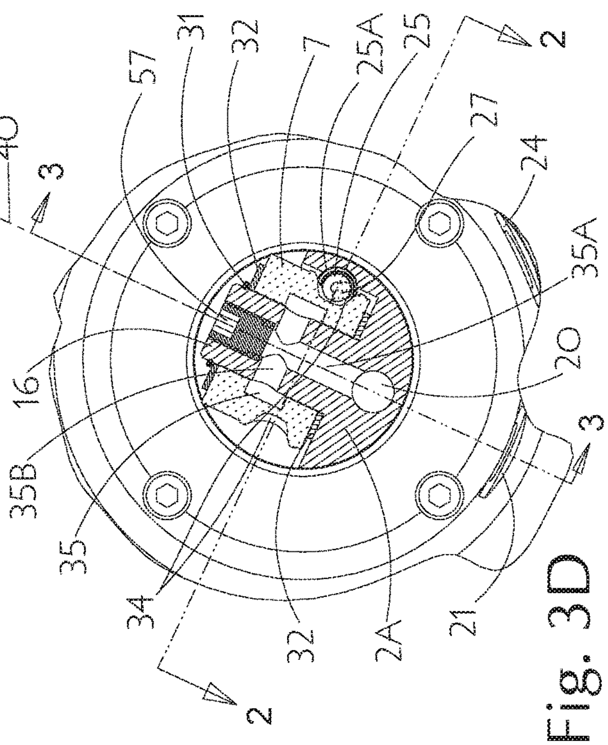
FIG. 3D is a cross sectional schematic end view across another section of the mast assembly with another nozzle of FIG. 3.
Figure 3A:
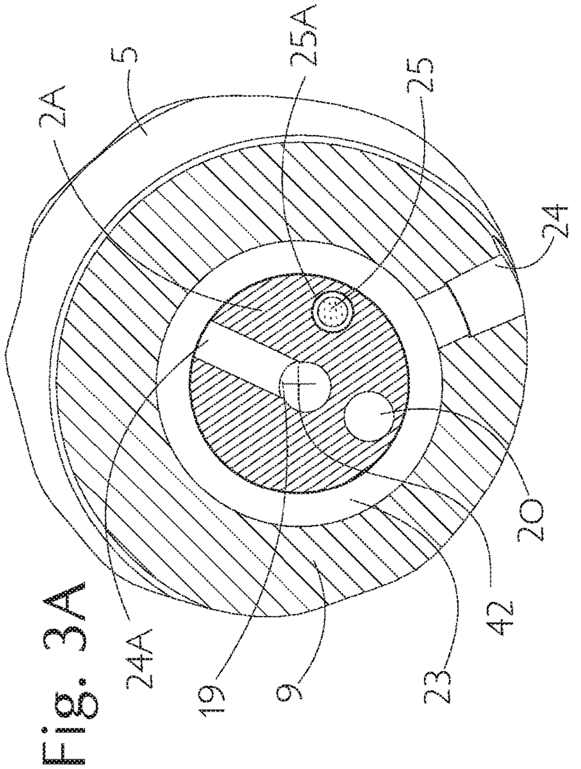
FIG. 3A is a cross sectional schematic end view across a section of the mast assembly and housing of FIG. 3.

FIG. 3A is a cross sectional schematic end view across a section of the mast assembly and housing of FIG. 3. The cross section is located through the fluid union housing 9 and mast assembly 2A at an orthogonal angle to the longitudinal axis 42. The cross section illustrates an exemplary offset position of the mast main port 20. The offset position facilitates locating the nozzle union 7 in a recessed position of the mast shaft that is closer to the longitudinal axis 42, so that the outer circumference of the mast assembly can be reduced to fit in smaller openings. An additional benefit is that the nozzle can more uniformly distribute the fluid from the region of the longitudinal axis 42 as the mast 2 rotates about the longitudinal axis.

FIG. 3A also illustrates the exemplary position of the mast auxiliary port 19, which in the exemplary environment is used to flow fluid to the auxiliary nozzle 8. The mast auxiliary port inlet 24 is formed through the sidewall of the fluid union housing 9, so that fluid can flow into the auxiliary rotary channel 23 formed between the fluid union housing 9 and the mast shaft 2A. Once the fluid is into the auxiliary rotary 23, the fluid can flow through the inlet 24A into the mast auxiliary port 19.

FIG. 3A also illustrates an exemplary offset position of the pitch drive rod 25. The pitch drive rod 25 can be inserted through a mast assembly rod opening 25A that is longitudinally formed in the mast shaft 2A. The pitch drive rod 25 can be rotated counter clockwise or clockwise to change the pitch of the nozzle union 7 shown in FIG. 3 as the pitch drive rod orbits about the longitudinal axis 42 described herein.

FIG. 3B is a cross sectional schematic end view across another section of the mast assembly and housing of FIG. 3. The cross section is located transversely through the fluid union housing 9 and the mast assembly 2A at the mast main port inlet 21. The mast main port inlet 21 is formed through the wall of the fluid union housing 9, so that fluid can flow into the main rotary channel 22 formed between the fluid union housing 9 and the mast shaft 2A. An inlet 21A is formed through the wall of the mast shaft 2A, so that fluid can flow from the channel 22 through the inlet 21A into the mast main port 20. Thus, regardless of the heading of the mast assembly 2 and therefore the heading of the mast main port 20, fluid can flow into the mast main port 20 and thence to the nozzle union 7 shown in FIG. 3.

Figure 3C:
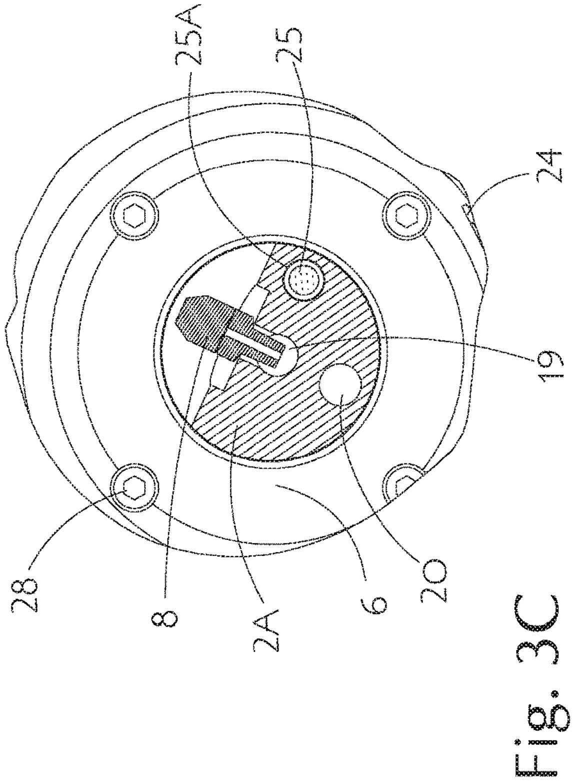
FIG. 3C is a cross sectional schematic end view across another section of the mast assembly with an auxiliary nozzle of FIG. 3.

FIG. 3C is a cross sectional schematic end view across another section of the mast assembly with an auxiliary nozzle of FIG. 3. The cross section is located transversely through the mast shaft 2A at the end of the flow path 19 as it enters the fixed auxiliary nozzle 8 for flow therethrough. The mast main port 20 can extend past the auxiliary port 19 to the nozzle union 7 in this embodiment. The pitch drive rod 25 is also shown, consistent with the views in FIGS. 3A and 3B.

FIG. 3D is a cross sectional schematic end view across another section of the mast assembly with a nozzle of FIG. 3. The cross section is located transversely through the mast shaft 2A at the nozzle union 7 near the end of the mast main port 20. Fluid in the mast main port 20 can flow to the fluid inlet 35A which in turn can flow to the fluid outlet 35B and then into the intersecting nozzle rotary channel 35. For manufacturing convenience, the fluid inlet 35A can be plugged downstream of the fluid outlet 35B with a plug 57 or other appropriate closures. The nozzle flow channel 35 can flow fluid into the nozzle union 7, regardless of the nozzle pitch.

FIG. 3D also illustrates the pitch drive rod 25 that is used to engage the nozzle union 7. Further details are shown in FIG. 5B. FIG. 5B is a cross sectional schematic top view through the nozzle of FIG. 3 and FIG. 3D. In at least one embodiment, the pitch drive rod 25 can rotatably engage the nozzle union 7 to rotate the nozzle union to different pitch angles "α" measured between the longitudinal axis 42 and the nozzle centerline 52. The pitch drive rod 25 can include a rod gear 27, such as a worm gear, described further in FIG. 4, which can engage a corresponding nozzle gear 34, which can also be a worm gear, formed on a peripheral surface of the nozzle union 7. To facilitate rotation of the nozzle union 7, a thrust washer 32 can be located at the bottom and top of the nozzle union 7 when installed around the nozzle union trunnion 16. A snap ring 31 can retain the nozzle union 7 onto the nozzle union trunnion 16.

Figure 4:
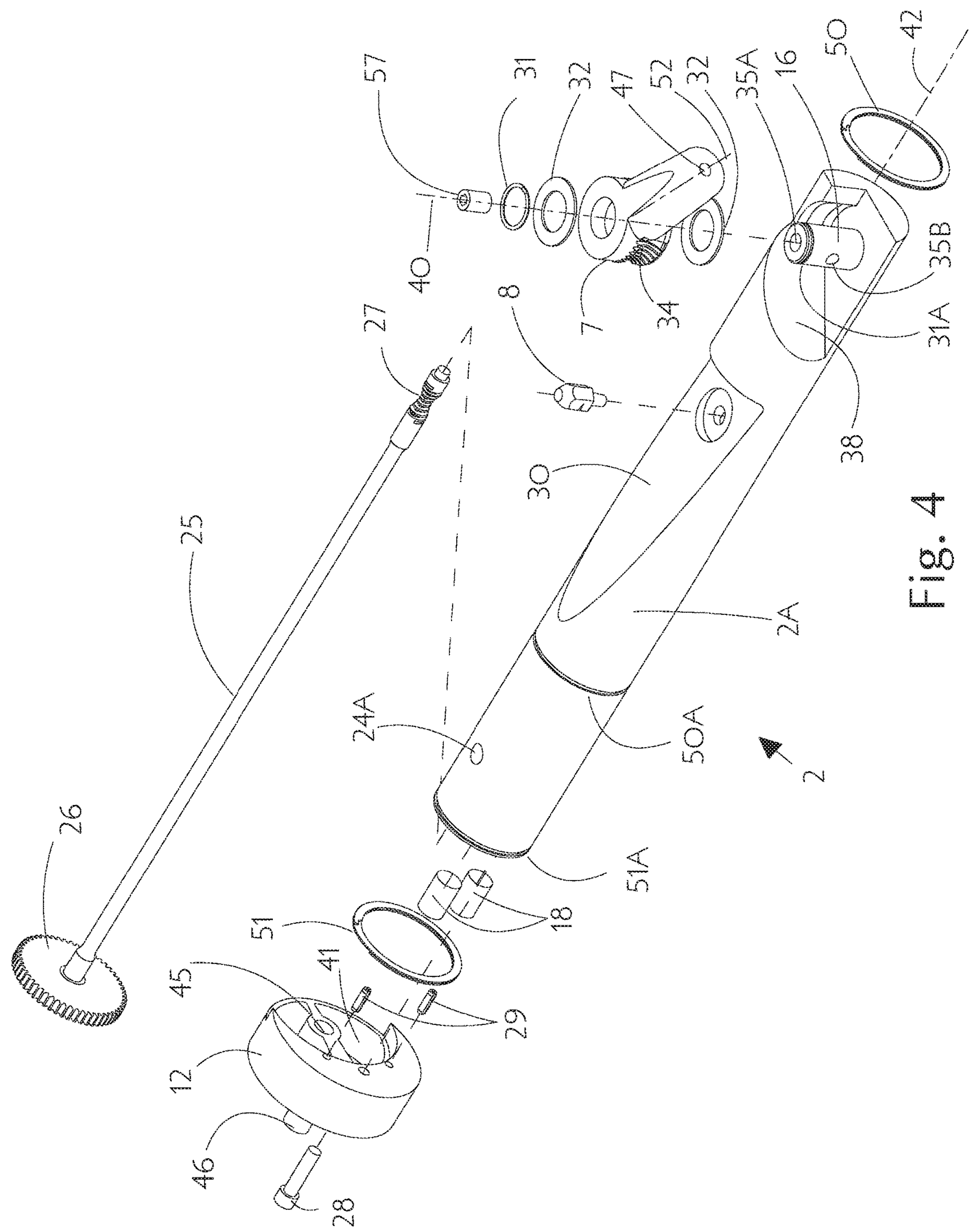
FIG. 4 is a schematic assembly view of a portion of the mast assembly.

FIG. 4 is a schematic assembly view of a portion of the mast assembly. The mast assembly 2 includes the mast shaft 2A into which and onto which the various components can be assembled. The mast shaft 2A in the exemplary embodiment includes a nozzle relief cutaway 38 for the nozzle union trunnion 16. The cutaway 38 allows the nozzle union 7 to be mounted at least in proximity to a longitudinal axis 42 around with the mast shaft 2A rotates. For the exemplary embodiment with an auxiliary nozzle 8, an auxiliary relief cutaway 30 can also be included. The relief cut away can allow the assembly to be more compact in circumference to allow the assembly to be inserted through smaller openings and other restrictive areas that otherwise might be inaccessible if the nozzle union 7 and/or auxiliary nozzle 8 were mounted on the outer surface of the mast shaft 2A. The nozzle relief cutaway 38 forms a surface from which the nozzle union trunnion 16 extends.

A thrust washer 32 can act as a bearing surface between the nozzle relief cutaway 38 surface and the lower portion of the nozzle union 7 when assembled thereto. The nozzle union 7 can include a nozzle gear 34 integral with or otherwise coupled to the nozzle union 7. The nozzle gear 34 forms an indexing system in conjunction with the mating rod gear 27 on the pitch drive rod 25 to control the rotation of the nozzle union 7. Other types of indexing systems can be provided, such as a rack and pinion, sprocket, chain or belt drive, and other engagement mechanisms for controlled rotation of an object about a central hub, as would be known to those with ordinary skill in the art given the teachings and disclosure herein. Further, manual actuators can be used to move the pitch drive rod 25 into a variety of positions that result in changing the pitch angle of the nozzle union 7. A second thrust washer 32 can be disposed on top of the nozzle union to provide a bearing surface for a retaining snap ring 31 that can be inserted into a snap ring groove 31A to hold the stack of components to the nozzle union trunnion 16. For manufacturing considerations, a flow passage can be formed into the top of the nozzle union trunnion 16 can be thereafter plugged to close a top section with a plug 57.

The pitch drive rod 25 can be coupled with the second pitch gear 26 described herein. The second pitch gear 26 rotates the pitch drive rod 25 which in turn rotates the pitch drive rod gear 27 formed on a distal end from the second pitch gear. The pitch drive rod gear 27 rotates the nozzle gear 34 to rotate the nozzle union 7 into different pitch angles. The pitch drive rod 25 passes through an opening in an offset portion of the mast shaft 2A, not shown in the particular perspective view but indicated by the assembly lines. On the distal end of the mast shaft 2A from the nozzle union trunnion 16, longitudinal flow passages, described above, can be formed in the mast shaft, and cross flow passages, such as the port inlet 24A, can be formed at an angle to the flow passages. After formation, the ends of the longitudinal flow passages plugged with port plugs 18 for manufacturing considerations. An assembly of seals and bearings can be held in position around the mast shaft 2A with bearing retainers 50, 51 that can be inserted into snap ring grooves 50A, 51A, respectively. The bearing retainers are also shown in FIG. 6. Bearing retainers can include snap rings, set screws, and other securing means using in the field. A mast drive carrier 12 can be coupled to the distal end of the mast shaft 2A from the nozzle union trunnion 16. The mast drive carrier 12 includes a cutaway portion 41 with a pitch drive rod carrier opening 45 that supports a distal end of the pitch drive rod 25, which in turn supports the second pitch gear 26 coupled thereto. Further, the mast drive carrier 12 includes a carrier shaft 46 for coupling with the heading drive 4 described herein. The mast main port 20, described above, provides a flow passage through the mast shaft 2A can deliver fluid to the nozzle union 7 and out the nozzle opening 47. The mast auxiliary port 19 described above can deliver fluid to an opening formed in the mast shaft to deliver fluid to the auxiliary nozzle 8.

Figure 5A:
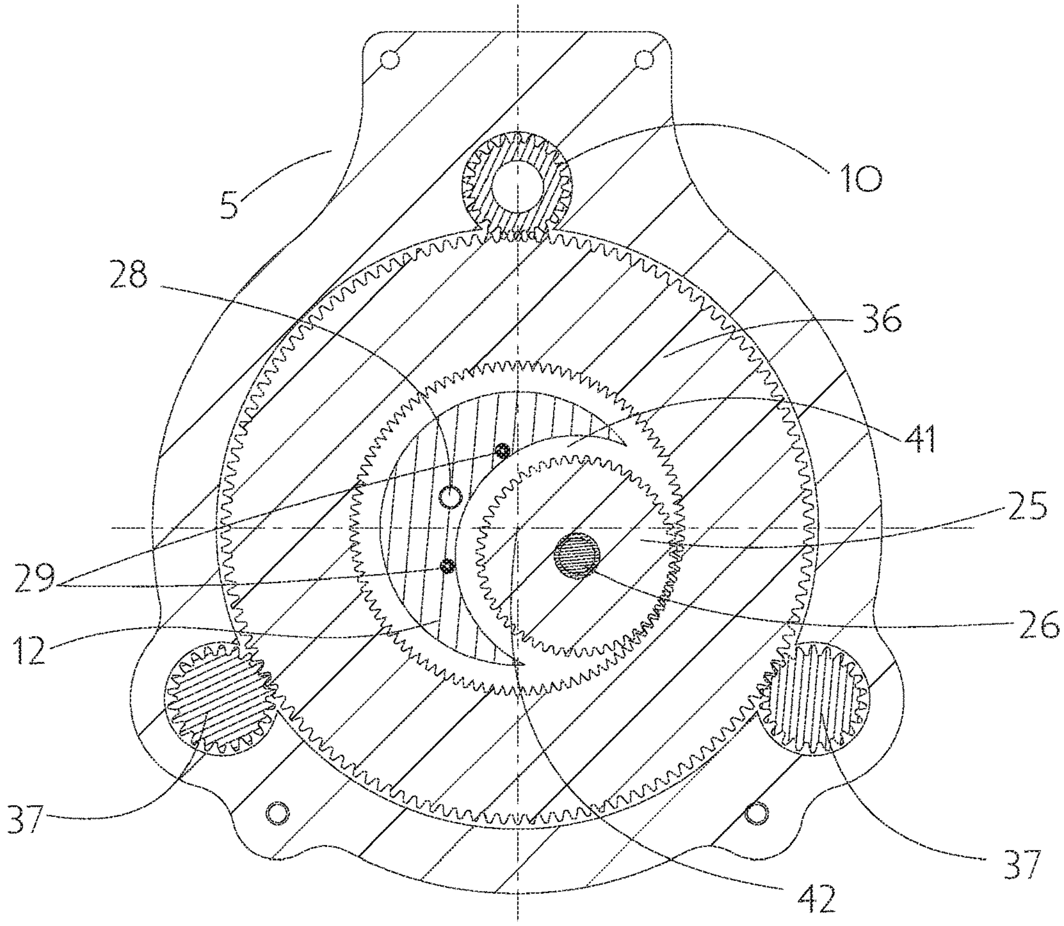
FIG. 5A is a cross sectional schematic end view across the housing of FIG. 3 facing away from the mast assembly.
Figure 5B:
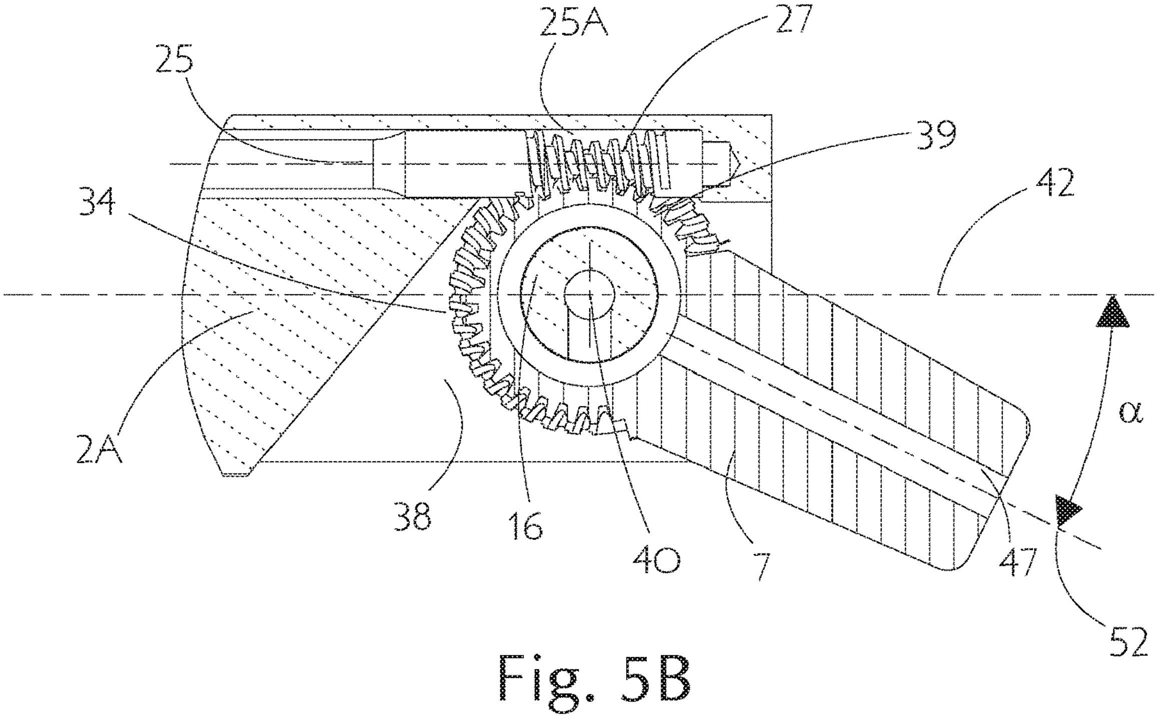
FIG. 5B is a cross sectional schematic top view through the nozzle of FIG. 3 and FIG. 3D.

FIG. 5A is a cross sectional schematic end view transverse to the longitudinal centerline at a location across the housing of FIG. 3 facing away from the mast assembly. FIG. 5A is from a viewpoint looking from the drive end toward the gearbox housing in the direction of the mast assembly. The gearbox housing 5 can support and enclose one or more of the gears described herein. For example, the pitch drive gear 10, which is coupled to the pitch drive 3 shown in FIG. 2 and FIG. 6, can be used to rotate and otherwise drive the first pitch gear 36. The first pitch gear 36 is held in position in this embodiment by two idler gears 37 in conjunction with the pitch drive gear 10. The idler gears 37 can be spaced around the periphery of the first pitch gear 36. The second pitch gear 26 can engage the first pitch gear 36, so that the second pitch gear will rotate in response to the first pitch gear rotation. The second pitch gear 26 is centrally coupled to the pitch drive rod 25.

The mast drive carrier 12 can be coupled to the mast shaft 2A shown in FIG. 4 and has a cutaway portion 41 to allow clearance for the second pitch gear 26. As a mast drive carrier 12 rotates about the center of rotation along the longitudinal axis 42, the second pitch gear 26 with the pitch drive rod 25 orbit about the longitudinal axis. By synchronizing the speed of the first pitch gear 36 with a pitch drive 3 acting through the pitch drive gear 10, the relative rotational speed of the first drive gear 36 compared to the rotational speed of the mast drive carrier 12 will determine whether a point on the second pitch gear remains in a fixed orientation or changes relative to the center of rotation along the longitudinal axis 42. A slower relative speed of the second pitch gear compared to the rotational speed of the mast drive carrier can cause the relative movement of a point on the second pitch gear to change in one direction. The change in orientation of the second pitch gear changes the relative orientation of the pitch drive rod 25 that rotates in the rod opening 25A that in turn rotates the rod gear 27 on the pitch drive rod, which in turn rotates the nozzle gear 34 on the nozzle union 7 and changes the pitch angle α of the nozzle union, as discussed above. A faster relative speed of the second pitch gear compared to the rotational speed of the mast drive carrier 12 can cause a point on the second pitch gear to move in an opposite direction.

The synchronization of the speed of the first pitch gear 36 compared to the mast drive carrier 12 will determine relative movement of the second pitch gear 26 and the resulting relative movement of the components coupled thereto. The relative movement of the second pitch gear when the rotational speed of the first pitch gear is synchronized out of phase with the speed of the mast drive carrier will cause the rotation of the second pitch gear 26 to be out of phase as it orbits about the center of rotation along the longitudinal axis 42, thus causing the pitch drive road 25 to rotate out of phase as it orbits also the center of rotation. As the pitch drive rod 25 rotates out of phase, it will turn the nozzle unit 7 to a different pitch angle by rotating the pitch rod gear 27 that engages the nozzle gear 34, described above. When the desired pitch is obtained, the first pitch gear 36 can be synchronized back into phase with the relative rotational speed of the mast drive 12, so that the second gear drive 26 and the pilot drive rod 25 remain in a desired orientation to the mast drive carrier as the pitch drive rod 25 and second pitch gear 26 orbit about the center of rotation along the longitudinal axis.

Figure 7B:
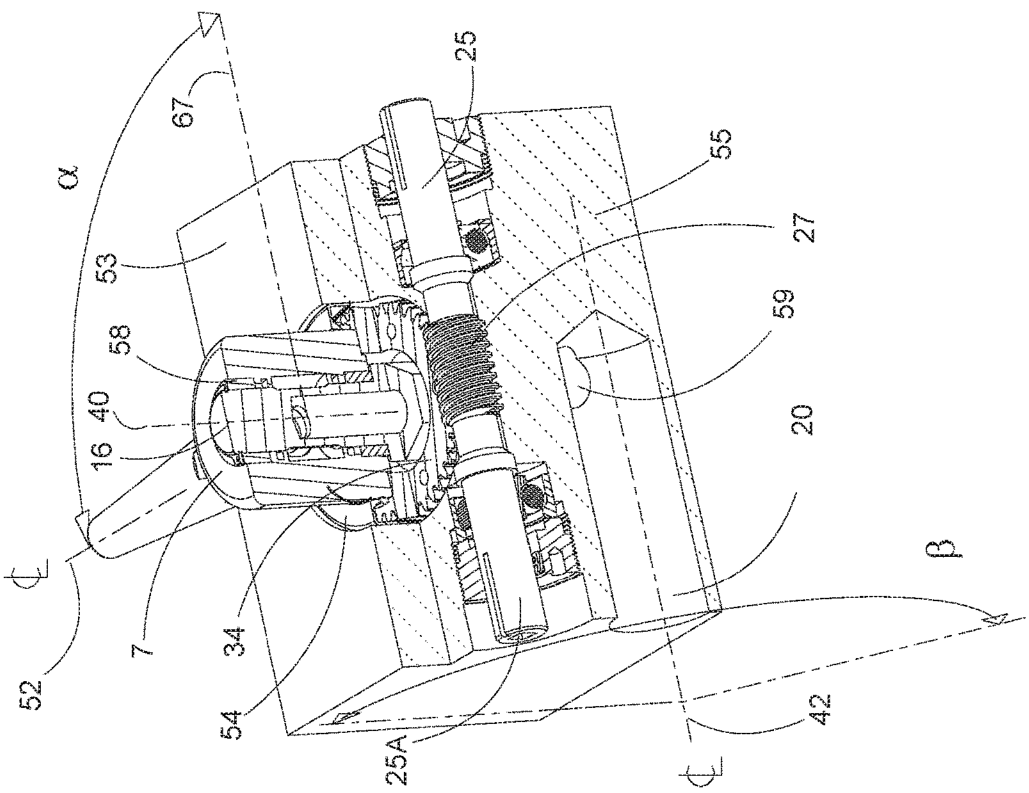
FIG. 7B is a partial cross sectional schematic perspective view of the housing of FIG. 7A.
Figure 7A:
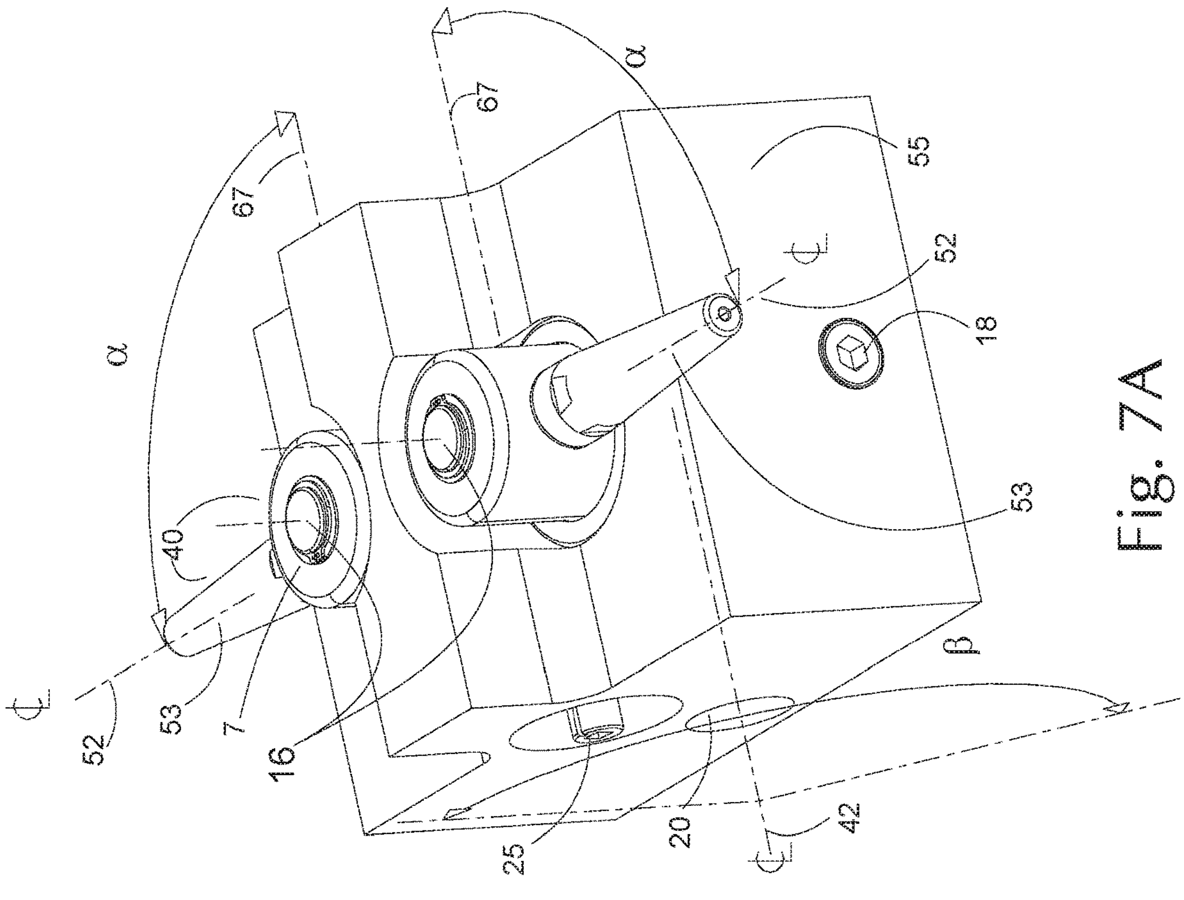
FIG. 7A is a schematic perspective view of a housing having a plurality of nozzles in a parallel configuration.
Figure 7C:
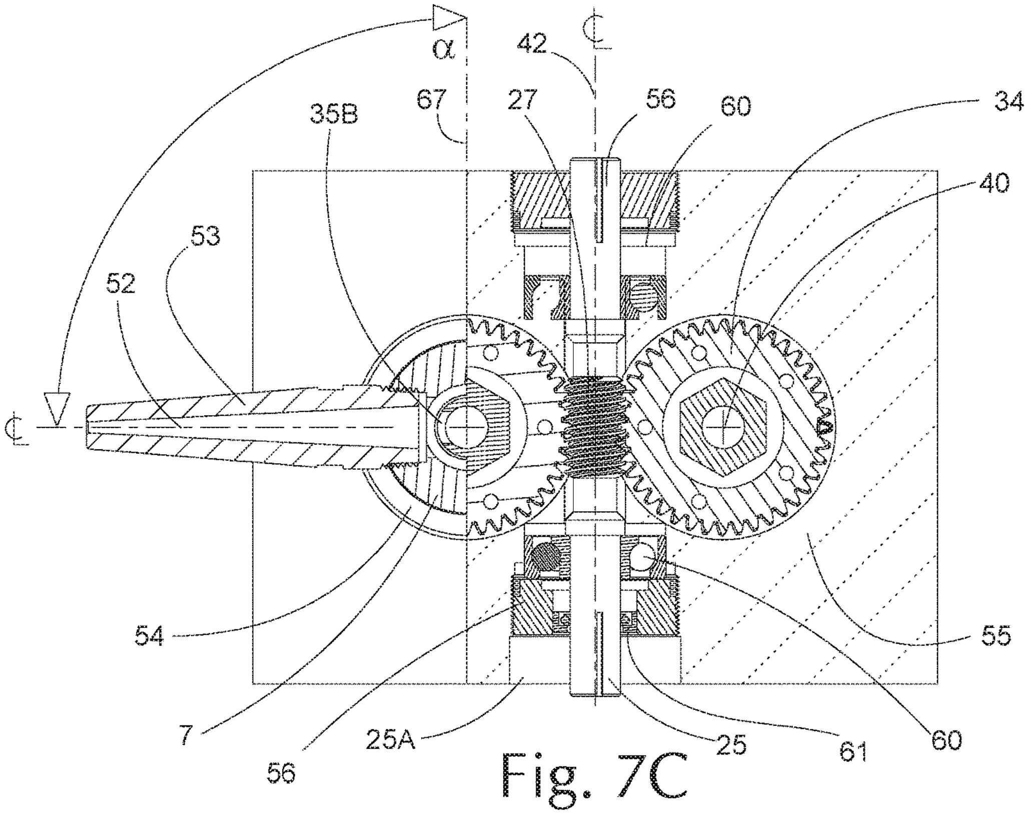
FIG. 7C is a cross sectional schematic top view of the housing of FIG. 7A.
Figure 7D:
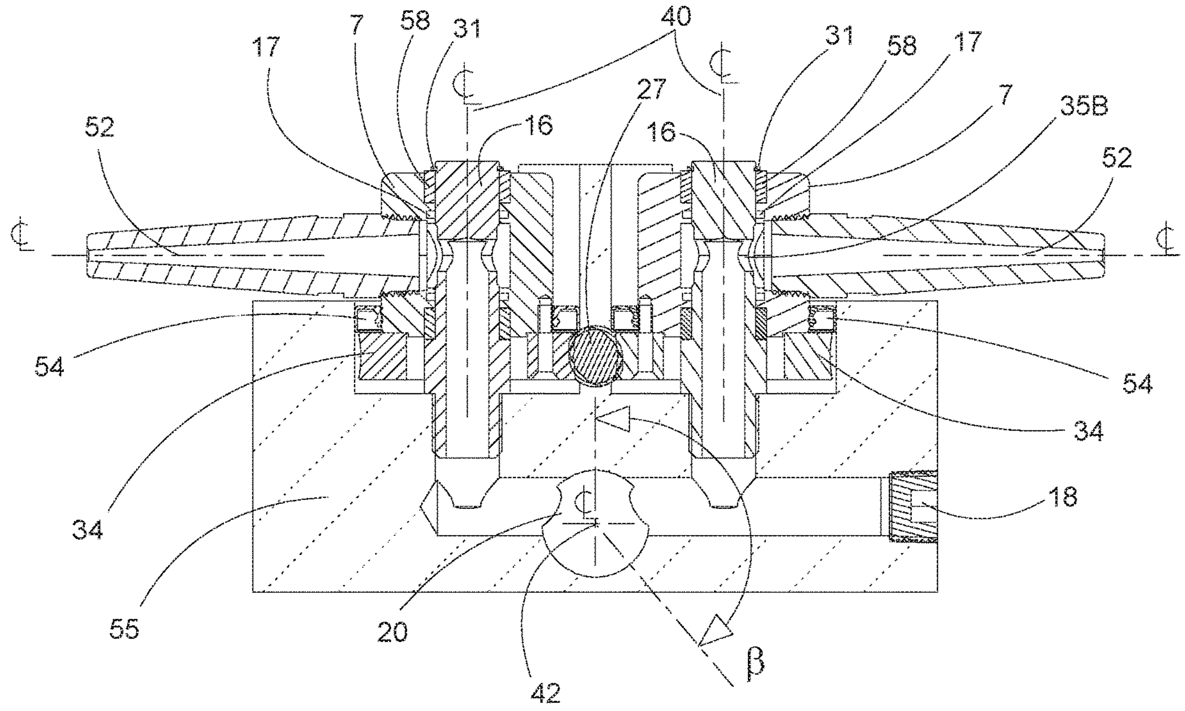
FIG. 7D is a cross sectional schematic end view of the housing of FIG. 7A.

FIG. 7A is a schematic perspective view of a housing having a plurality of nozzles in a parallel configuration. FIG. 7B is a partial cross sectional schematic perspective view of the housing of FIG. 7A. FIG. 7C is a cross sectional schematic top view of the housing of FIG. 7A. FIG. 7D is a cross sectional schematic end view of the housing of FIG. 7A. In some embodiments, a plurality of nozzles can interact together. In some embodiments, the flow and direction of fluid from the plurality of nozzles can be, but not necessarily, balanced in their outlet directions, so that a minimum sideways resulting force is created to the mast shaft described herein. In other embodiments, an imbalance may be intended to move the mast shaft from the resulting force of the imbalance. It may be advantageous to couple the movement of the plurality of nozzles and for convenience, the coupling can occur through a housing to couple various components together. The housing can be open to expose the components to ambient conditions or at least partially closed to protect the components from the ambient conditions. Some exemplary embodiments are illustrated as parallel configurations and in serial configurations, as described below. Other configurations are possible, including various numbers of nozzles and associated components. In some embodiments, a housing can be used to form a component for the plurality of nozzles.

The nozzle housing 55 can be a separate unit that is coupled to the drives 3 and 4 and may be coupled with the gearbox housing 5 and fluid union housing 9 as described above. In such embodiments, the nozzle housing 55 could be rotated to different heading angles as described above by being coupled to the rotation of the pitch drives and gears described above. The heading of the nozzles can be accomplished by connecting an intermediate coupling member between the heading drive (and any gears as described above) and the housing, so the housing would rotate with the coupling member as the drive rotates the coupling member. In some embodiments, then coupling member can be a hose connected to the main mast port to provide fluid to the nozzles. In other embodiments, the coupling member can be a rod or tube and can include a universal joint for angular deflections.

In other variations, the housing can be an integral unit with the mast shaft 2A, so that a plurality of nozzles would be mounted to the mast shaft 2A with heading rotation changed with the mast shaft.

Further, multiple housings 55 can be coupled together with the associated pitch drive rods 25 and flow paths by intermediate coupling members between the housings if desired. Such coupling could allow, for example, an elongated spray system 1 with multiple nozzles acting along a length of the spray system that could be used in elongated containers such as in railcars, refineries, and other applications.

The nozzle housing 55 includes components described in more detail above and aspects particular to these exemplary embodiments will be described below. In general, a plurality of nozzle unions 7 with nozzles 53 having a centerline 52 can each rotate about an axis 40 of their respective nozzle union trunnion 16 and a rotationally coupled to the nozzle housing 55 through the trunnion. A cylindrical bushing 58 can be inserted between perimeters of the nozzle union trunnion 16 and the nozzle union 7 to assist the nozzle union in rotating about the trunnion. Each nozzle can rotate by an angle $\alpha$ measured between a reference line 67 to the nozzle centerline 52. The reference line 67 is parallel to the longitudinal axis 42 described above. The nozzles can move in synchronous rotation for pitch or can be independently controlled to different pitch angles within a given housing or relative to other nozzles in other housings. A pitch drive rod 25 passes into the nozzle housing 55 through a rod opening 25*a*. The pitch drive rod 25 includes a portion formed as a rod gear 27. Correspondingly, the nozzle union 7 includes a portion formed as a nozzle gear 34. The rod gear 27 rotates which in turn rotates the nozzle gear 34 to rotate the nozzle 53 through the angle $\alpha$. A seal 54 can seal the nozzle union 7 from debris and other contaminants. The pitch drive rod 25 can be supported in the nozzle housing 55 by one or more bearings 60. In some embodiments, the nozzle housing 55 can include a bearing retainer 56 on one or both ends of the pitch rod passing through the nozzle housing 55. A seal 61 can seal the pitch drive rod through the bearing retainer 56 in those embodiments in which the pitch drive rod passes through the bearing retainer. The flow path to supply fluid to the nozzle 53 is similar as has been described above using the mast main port 20. In this embodiment, the mast main port 20 can flow into the nozzle housing 55. A transverse nozzle union port 59 can provide fluid from the mast main port 20 to each of the nozzles 53. Due to manufacturing concerns, the nozzle trunnion port 59 can be formed by cross-drilling into the nozzle housing 55 to intersect the mast main port 20 and then plugged with a port plug 18 near the wall to seal the port 59 to the port 20. Other methods of forming the nozzle trunnion port 59 can also be used. The fluid flows through the nozzle trunnion port 59 into the fluid inlet 35A of the nozzle union trunnion 16. From the fluid inlet 35A of the trunnion, the fluid flows into the fluid outlet 35B of the trunnion, into the nozzle rotary channel 35, into the nozzle 53, and out the nozzle opening 47, as has been described in prior figures.

Figure 8B:
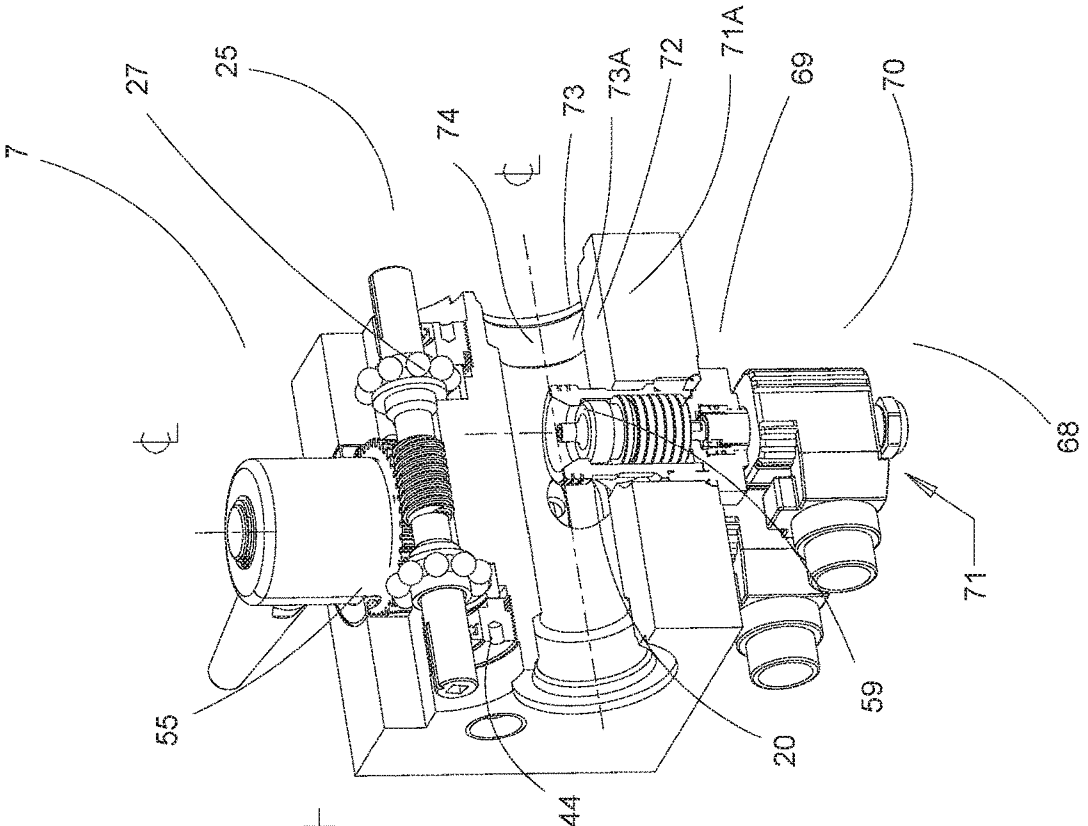
FIG. 8B is a partial cross sectional schematic perspective view of the housing of FIG. 8A.
Figure 8A:
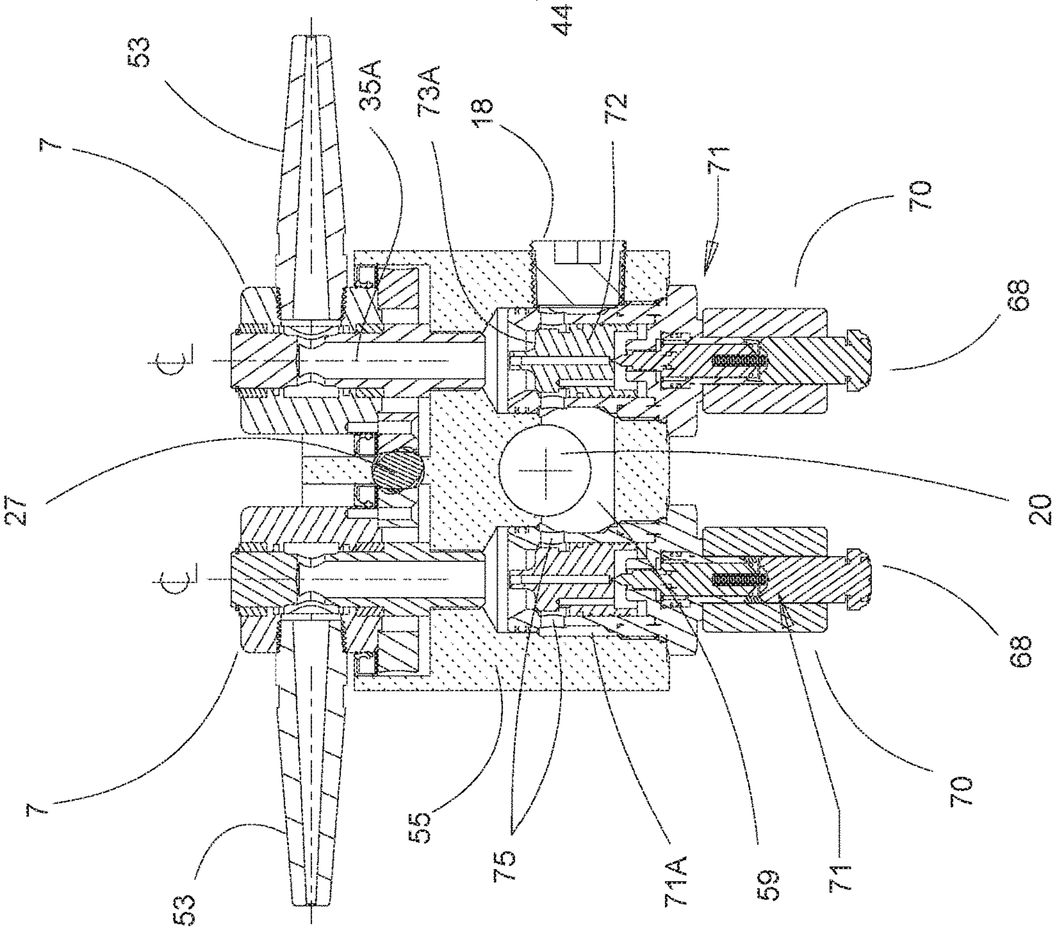
FIG. 8A is a schematic perspective view of a housing having a plurality of nozzles in a parallel configuration.

FIG. 8A is a schematic perspective view of a housing having a plurality of nozzles in a parallel configuration. FIG. 8B is a partial cross sectional schematic perspective view of the housing of FIG. 8A. In this embodiment, an exemplary flow control system is shown that can vary the fluid flowing through one or both nozzles in a given housing. Otherwise, the elements can be similar to those described above. One or more openings 71A can be formed in the housing 55 that is fluidicly coupled to the nozzle trunnion port 59 and the fluid Inlet 35A, where the fluid inlet 35A is fluidicly coupled to the nozzle 53, as described above. A poppet valve 71 can be coupled in the housing opening 71A to control the flow of fluid between the nozzle trunnion port 59 and the fluid Inlet 35A. A separate poppet valve 71 can be used for each nozzle to be controlled. In other embodiments, a poppet valve can be used to control flow to a given set of nozzles, such as a plurality of nozzles in a given housing. In at least one embodiment, the poppet valve can be a solenoid-operated poppet valve. A solenoid-operated poppet valve generally includes a valve armature coil mount post 68 coupled to a valve armature 69, which is surrounded by a valve coil 70. The valve armature 69 can be coupled to a poppet 72 that engages a seat 73A formed in the poppet valve body 73. When energized, the valve armature 69 moves within the coil 70 and can be biased to pull the poppet 72 away from the seat 73A. Fluid can then flow between the nozzle trunnion port 59 into an inlet 75 of the poppet valve then past the seat 73A and into the fluid inlet 35A and thence to the nozzle 53. The poppet valve(s) can be controlled with energy that can be supplied for example through a power port 44 to the housing, or other purposes.

Figure 9A:
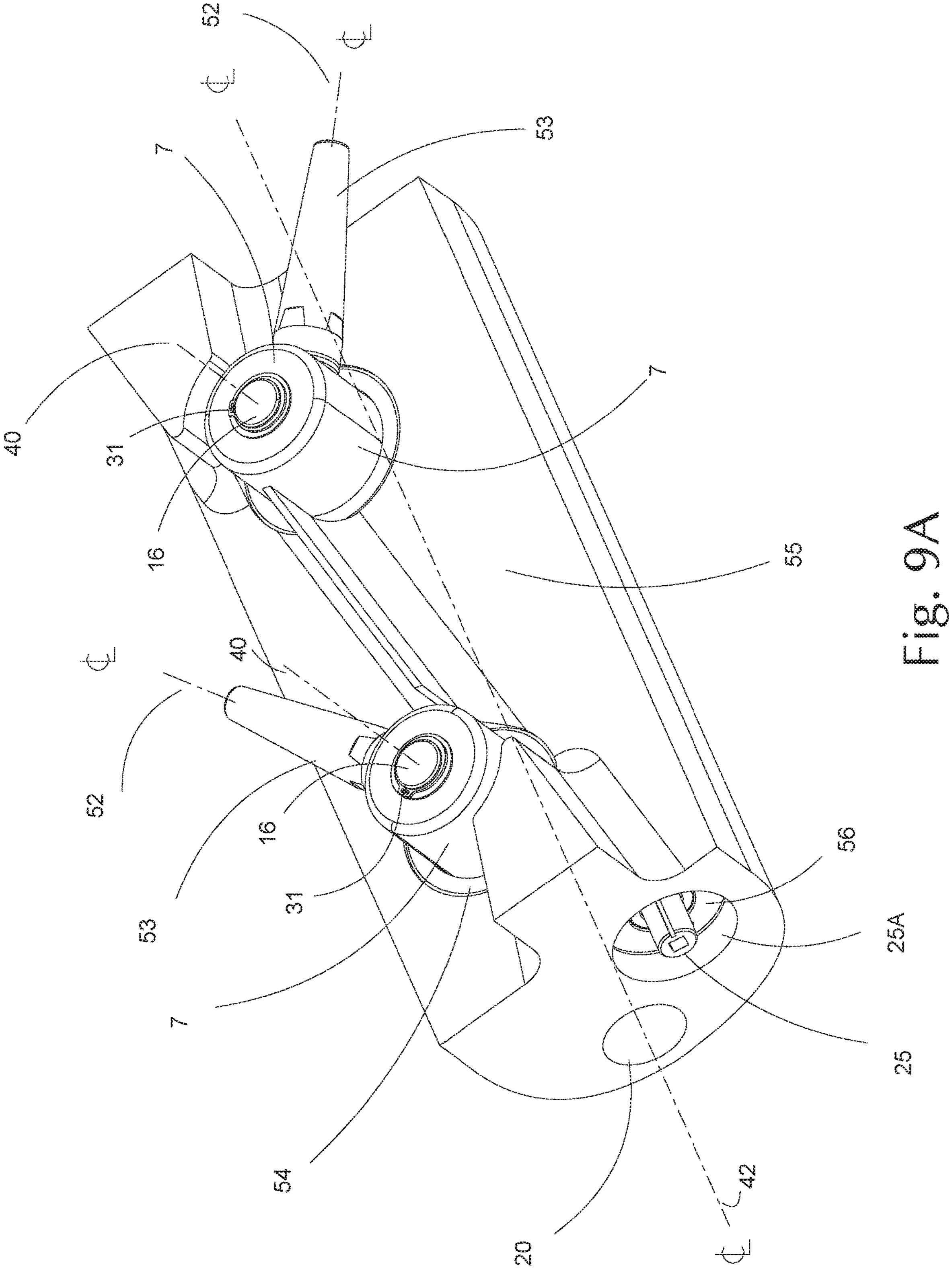
FIG. 9A is a schematic perspective view of a housing having a plurality of nozzles in a serial configuration.
Figure 9B:
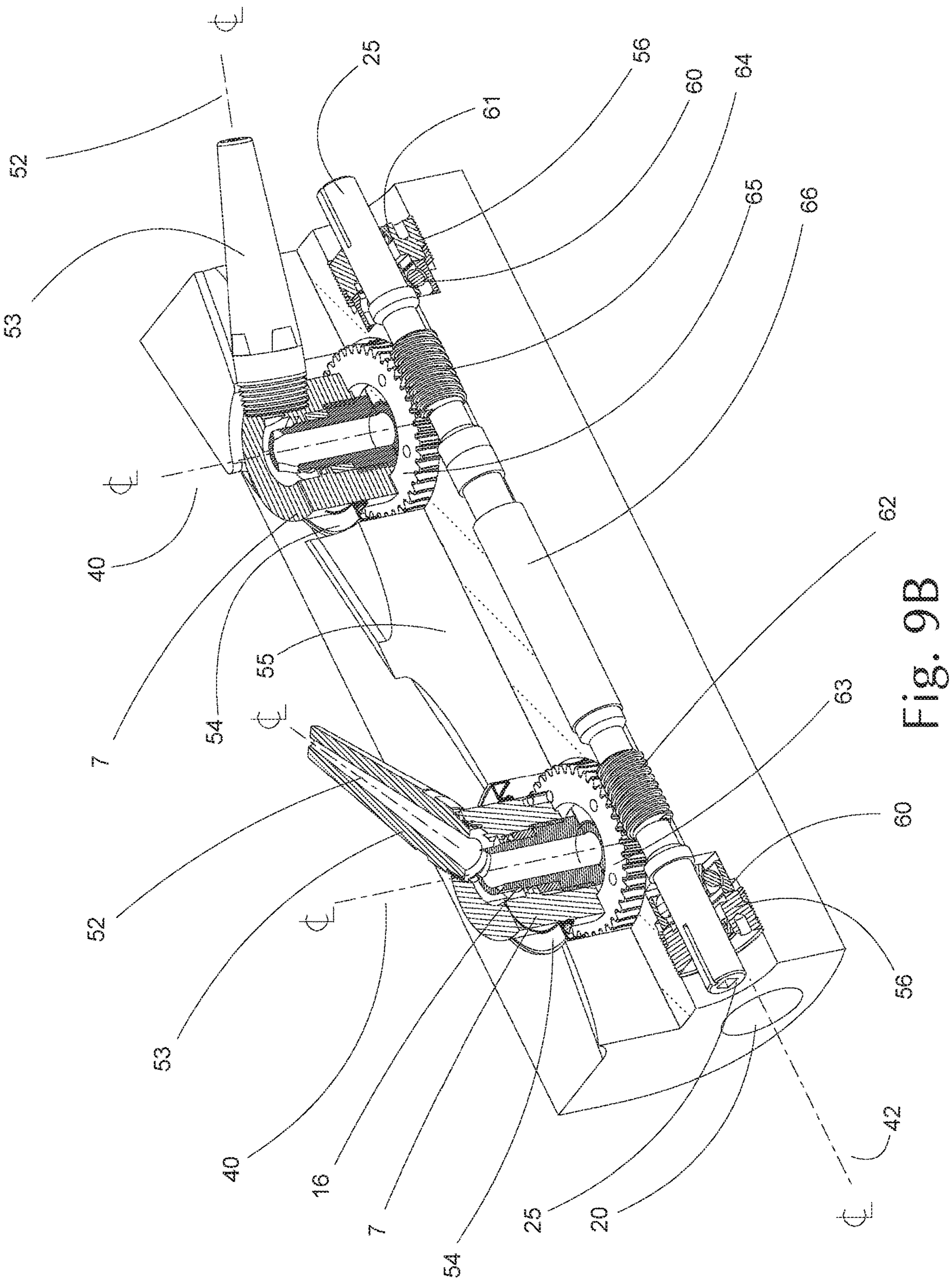
FIG. 9B is a partial cross sectional schematic perspective view of the housing of FIG. 9A.
Figure 9D:
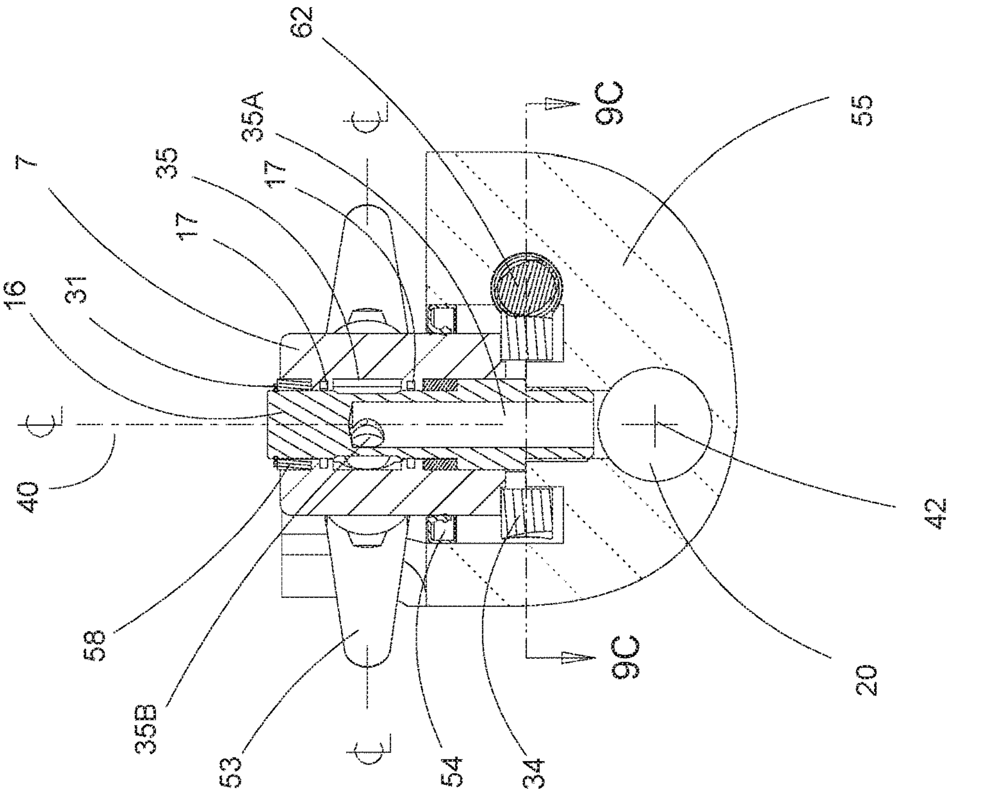
FIG. 9D is a cross sectional schematic end view of the housing of FIG. 9A.
Figure 9C:
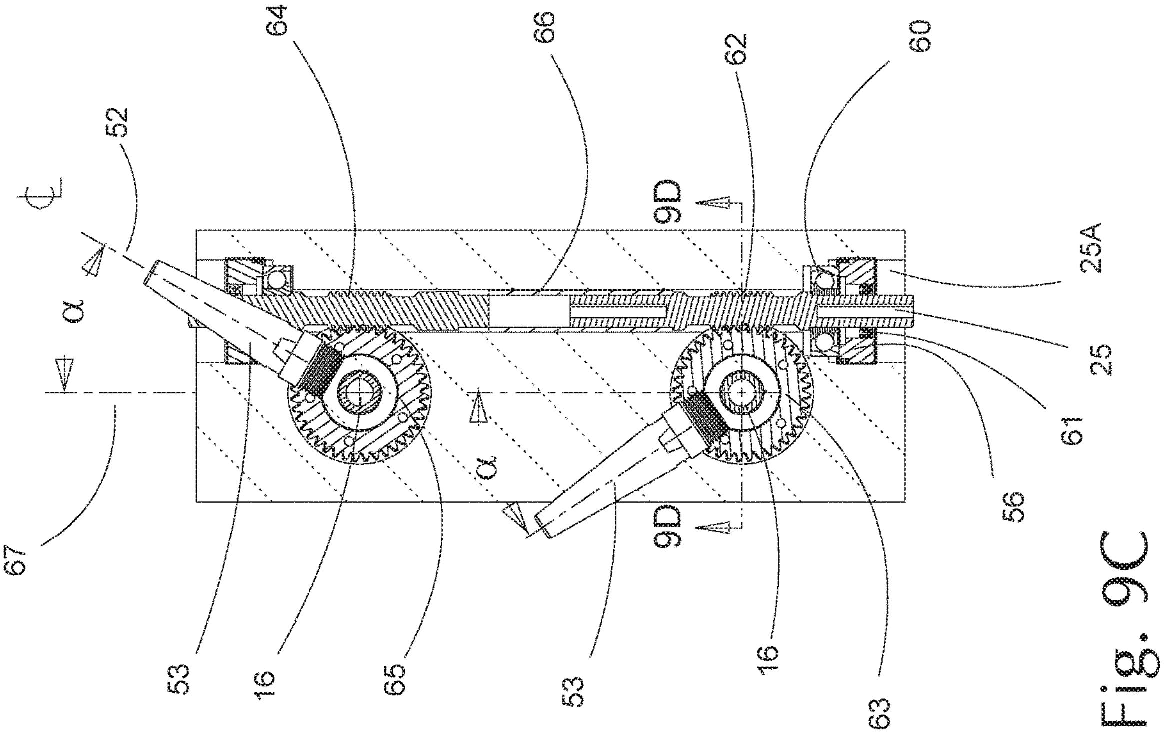
FIG. 9C is a cross sectional schematic top view of the housing of FIG. 9A.

FIG. 9A is a schematic perspective view of a housing having a plurality of nozzles in a serial configuration. FIG. 9B is a partial cross sectional schematic perspective view of the housing of FIG. 9A. FIG. 9C is a cross sectional schematic top view of the housing of FIG. 9A. FIG. 9D is a cross sectional schematic end view of the housing of FIG. 9A. In this embodiment, the nozzles are aligned in series along the longitudinal axis 42. Such an embodiment could be advantageous, for example, in passing through restricted size openings. The components are similar as has been described above and aspects particular to these embodiments are discussed below. Although not shown, it is understood that the flow through one or more of the nozzles can be controlled in this or other embodiments, such as with the flow control system described above.

A nozzle housing 55 includes a plurality of nozzles 53 about an angle α relative to a reference line 67 that is parallel to the longitudinal axis 42. The rotation of the nozzles is controlled by a control rod 25 with a plurality of rod gears 62 and 64. The rod gears 62 and 64 are rotatably coupled with corresponding nozzle gears 63 and 65. As the rod 25 rotates with the rod gears 62 and 64, the nozzle gears 63 and 65 correspondingly rotate which causes the nozzles 53 to rotate about the angle α.

In at least one embodiment, the rotation of the nozzles can be in opposite directions. Because the nozzles are on the same side of the rod 25, it is advantageous for one set of a rod gear and nozzle gear to be formed with right-hand threads and the other set to be formed with left-hand threads. For ease of manufacturing, a separate control rod with opposite formed threads than the other control rod can be made for one of the sets of threads. The separate control rod can be coupled with the other control rod through a coupler 66 that can fit within the rod opening 25A. In other embodiments, the rotation of the nozzles in the angle α can be in the same direction and left-hand or right-handed threads can be used for both nozzles. For embodiments having more than the two exemplary nozzles and associated components illustrated, the direction and angle of rotation of the nozzles can be influenced by the particular application intended, such as more nozzles rotating in one direction for odd numbers of nozzles, and equal number of sets of nozzles rotating in both directions for even numbers of nozzles.

Figure 10:
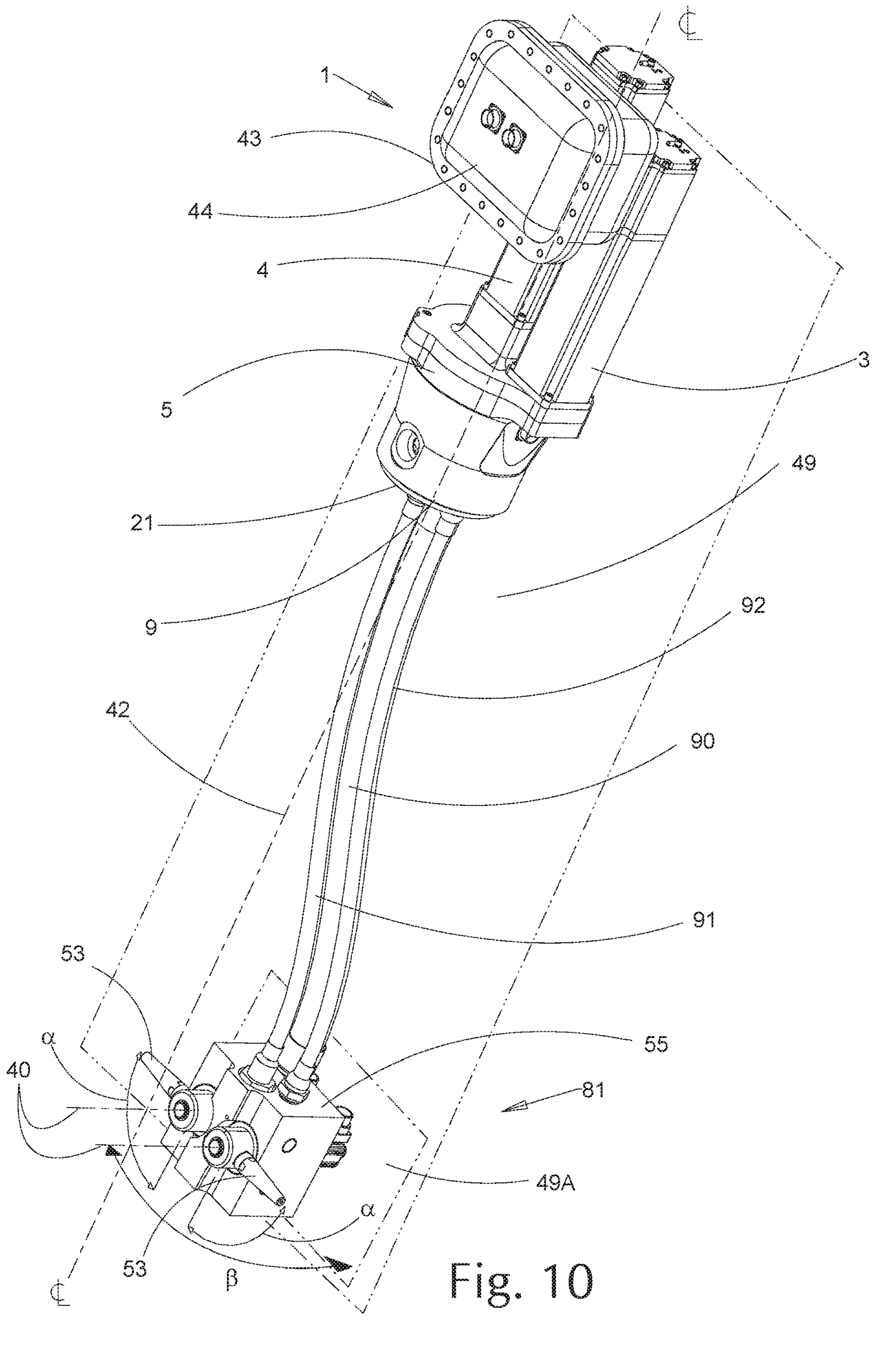
FIG. 10 is a schematic front view of an alternative embodiment of the multi-axis articulating and rotary spray system.

FIG. 10 is a schematic front view. The system 1 can be configured with a flexible mast assembly 2. In at least one embodiment, the mast assembly 2 can be coupled to a fluid union housing 9 which in turn is coupled to a gearbox housing 5 as described above, with any adjustments made to the gearbox housing 5 and/or union housing 9 including connections for the flexible members, as would be known to those with ordinary skill in the art given the teachings herein. The mast assembly 2 can include a flexible mast shaft 78 coupled to one or more nozzle housings 55. A mast main port conduit 90 can be coupled between the fluid union housing 9 and the nozzle housing 55. The conduit 90 can provide a flow path of the mast main port 20 described above for fluid flowing between the fluid union housing 9 and the nozzle housing 55 of a module 81, described in more detail in FIG. 11. The heading drive 4 can rotate the conduit 90, which in turn can rotate the module 81 to change the heading angle relative to a plane 49A. The plane 49A passes through the longitudinal axis 42, as the center of rotation of the conduit 90 at the fluid union housing 9 to which the conduit is coupled. Similar to FIG. 1, the plane 49A is parallel to the datum plane 49, passing through the centerlines of the drives 3 and 4. A flexible pitch member for controlling the pitch, such as a rod conduit 91 with at least a partially enclosed flexible pitch drive rod 25, is coupled between the gearbox housing 5 and or food housing 9 to the nozzle housing 55. The pitch drive rod 25 can be rotated by the pitch drive 3 and associated gears to rotate the gears and thence the nozzles along the angle alpha in the nozzle housing 55 described above. A third conduit, a control conduit 92, can at least partially enclose control elements, such as wires, optical cable, pneumatic or hydraulic tubing, electrical cable, and other elements for providing information from and to the housing 55 and for operation of the nozzles 53 of an alternative embodiment of the multi-axis articulating and rotary spray system.

Figure 11:
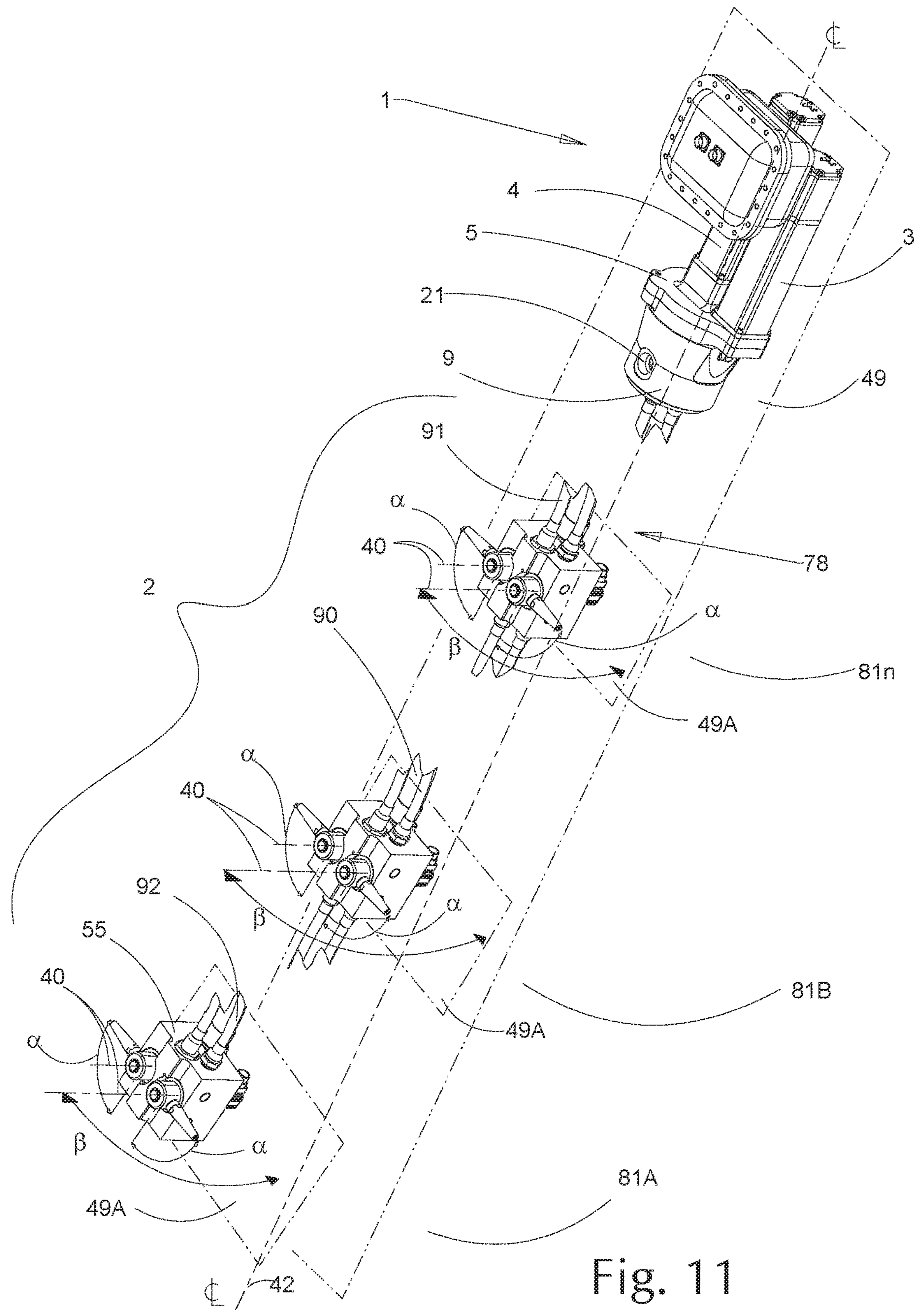
FIG. 11 is a schematic front view of another embodiment of the multi-axis articulating and rotary spray system.

FIG. 11 is a schematic front view of another embodiment of the multi-axis articulating and rotary spray system. In this embodiment, a plurality of nozzle housings 55 can be coupled to a flexible mast assembly 2. The embodiment is shown with the plurality of nozzle housings 55 coupled in series with a flexible mast shaft 78. However, in other embodiments, one or more nozzle housings could be coupled in parallel. The nozzle housings 55 can be partially enclosed by cages 80 that can protect the nozzles as the housings are rotated by the drives at the different headings and pitches in which the nozzles travel and still allow the nozzles to flow. The cages 80 can be made of a variety of materials, including metals and structural plastics. In some embodiments, the cage 80 can be shaped so that the nozzles may not extend outside a space defined by the exterior surfaces of the cage to protect the nozzles regardless of the heading and pitch. The nozzle housing and cage assembly is herein termed a "module". In the Figure, the module 81A is the leading module that would first enter a container or otherwise be disposed at the end of the mast assembly 2, following by other modules, such as modules 81B to 81*n* for the number that is appropriate for a given application (generally "module 81"). The modules can be controlled with remotely controlled valves, such as the valves 71 described in FIGS. 8A and 8B.

The drives 3 and 4 can be coupled to the gearbox housing 5 and to the fluid union housing 9. The flexible mast shaft 78 can be separated into segments to couple the modules together at intervals along the flexible mast shaft. The intervals can vary, depending the application, and can be uniformly or non-uniformly spaced. Similar to FIG. 10, the heading drive 4 can rotate the conduit 90, which in turn can rotate the modules 81A, 81B, through 81*n*, each generally having a housing 55 and associated nozzles, ports, and optional controls. Rotation of the conduit 90 changes the heading angle relative to the plane 49A passing through the longitudinal axis 42 as the center of rotation of the conduit 90 at the fluid union housing 9 to which the conduit is coupled. The plane 49A is parallel to a datum plane 49, passing through the centerlines of the drives 3 and 4. Movement of the flexible rod in the rod conduit 91 can change the pitch of the nozzle(s) in the housing(s) 55.

Thus, fluid through the mast main port conduit 90 can flow from the fluid union housing 9 into the nozzle housing 55 and partially through the nozzles mounted thereon while the remaining fluid can continue through subsequent housing and nozzles via the subsequent segments of the flexible mast shaft 78. Likewise, the rotation of the pitch drive rod, as described above through the rod conduit 91, can rotate the gears in the plurality of nozzle housings and therefore rotate the nozzles in pitch, generally in a synchronized manner. The control conduit 92 can provide controls and information to the various nozzle housings. The conduits can be protected by a covering (not shown).

While flexibility can be accomplished by bendable conduits, such as hoses, it is understood that the flexibility can also be accomplished in other ways. For example, a rigid main port conduit 90 and rod conduit 91 with one or more flexible or universal joints that allow articulation at an angle. Further, in some embodiments, the plurality of nozzle housings 55 could be mounted in a rigid fashion without intended angular articulation to maintain clearances and other parameters as may be desired for a given application.

Figures 12A, 12B, 12C:
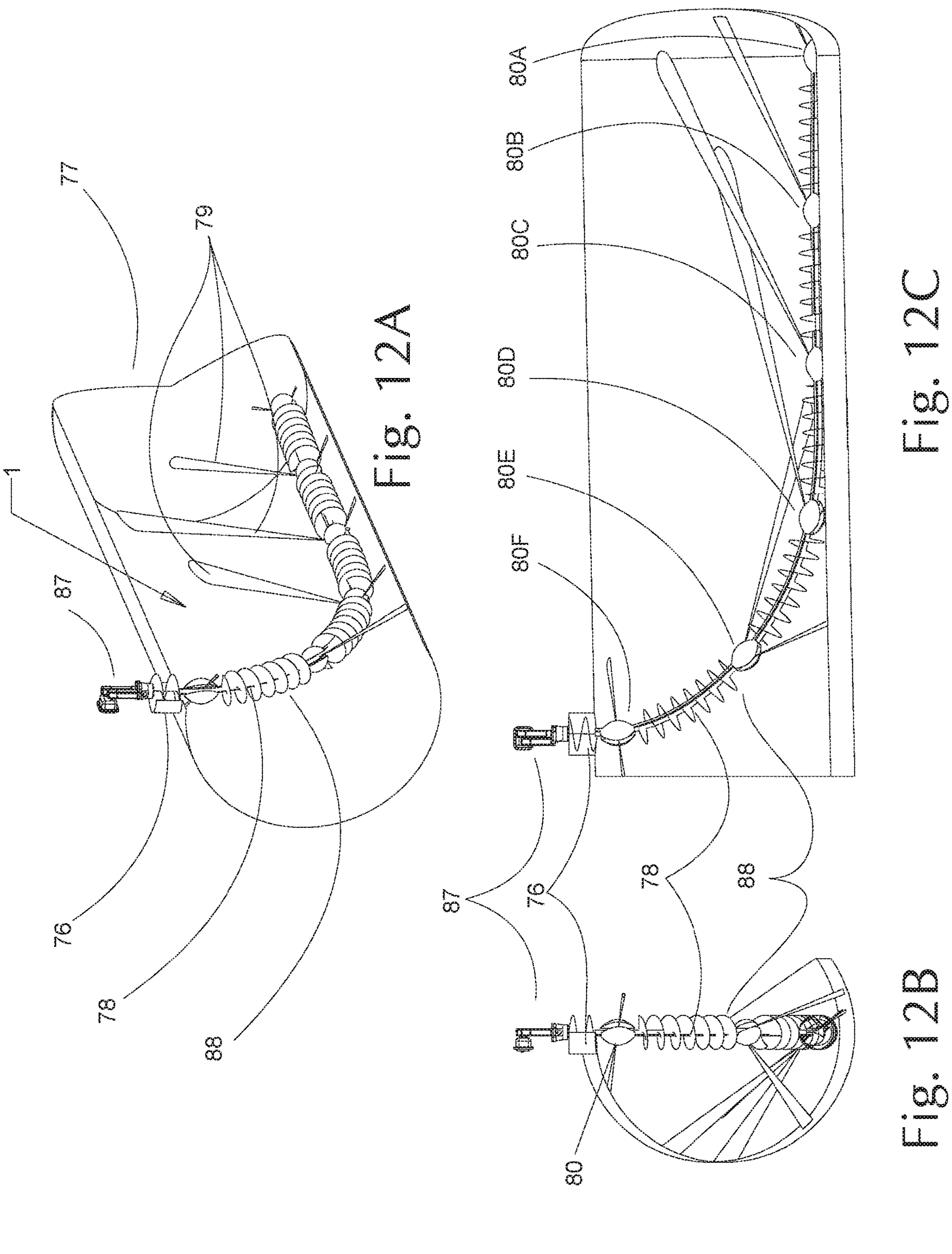
FIG. 12A is a schematic partial cross sectional perspective view of an exemplary container with a flexible system shown disposed therein similar to the embodiment in FIG. 11.
FIG. 12B is a schematic partial cross sectional end view of the exemplary container with the flexible system shown in FIG. 12A.
FIG. 12C is a schematic cross sectional side view of the exemplary container with the flexible system shown in FIG. 12A.

FIG. 12A is a schematic partial cross sectional perspective view of an exemplary container with a flexible system shown disposed therein similar to the embodiment in FIG. 11. FIG. 12B is a schematic partial cross sectional end view of the exemplary container with the flexible system shown in FIG. 12A. FIG. 12C is a schematic cross sectional side view of the exemplary container with the flexible system shown in FIG. 12A. An exemplary application using the system 1 is for cleaning container with contaminants, although it is understood that any application may apply that benefits from a flow of a substance through an opening. In this schematic, an access opening 76 can be formed at an angle to the length of an enclosed container 77. The access opening 76 can have a restricted size that may be difficult to mount a rigid system therein to service the length of the container. Thus, a system 1 with a flexible mast shaft 78 may offer advantages in this application. The flexible system 1 can be inserted through the access opening and flexibly bend to travel along the length of the container 77. The drive assembly 87 (such as having drives 3 and 4 described herein) can cause the nozzles in the modules 80A-80E (generally "80") on the mast shaft 78 to rotate in heading orientations and cause the nozzles mounted on the nozzle housings to change pitch orientations, while fluid from a fluid source (not shown) flows into the system and out of the nozzles.

The flow control through the nozzles can be used in a number of ways and for a number of purposes. For example, one nozzle can be activated to flow fluid under pressure to push the housing in the opposite direction from the thrust of the pressurized fluid. The direction is controlled by the direction of the flow through the nozzle. The housing can be pushed to the left or right in the container. The flow through the nozzles can also be alternated to create a modulation of the modules to spray the fluid in different lateral locations to propel waste like an auger, to move the nozzle forward or backward, or for other purposes.

One or more fluid streams 79 are shown at a particular heading and pitch that are angled high up on the container wall and the opposing streams can hit low and close on the container bottom. The change in direction as the nozzle rotates can encourage effective cleaning by applying pressurized fluid to a typical thick heel of contaminants in the container bottom. As the system 1 with the modules 80 approach an end wall, the pitch of one or more of the nozzles can be directed to concentrate on the end wall.

In some embodiments, the system can include reciprocating or rotating cleaning tools, such as brushes, scrapers, and other tools that can mechanically assist in removing waste and debris from a surface to be cleaned or otherwise treated by the fluid flowing from the nozzles. In this embodiment, brushes 88, such as spiral brushes, can be coupled around the conduits described in FIGS. 10 and 11 to mechanically abrade the contaminants and assist the efficacy of the streams 79. Further, the spiral brushes 88 can act like an auger and push heaver materials toward the center of the tank for removal as the heading rotates clockwise. In other embodiments, the cleaning tools can be propelled by any suitable energy source, including pressurized fluid, electrical, magnetic, or other energy forms.

Figure 13A:
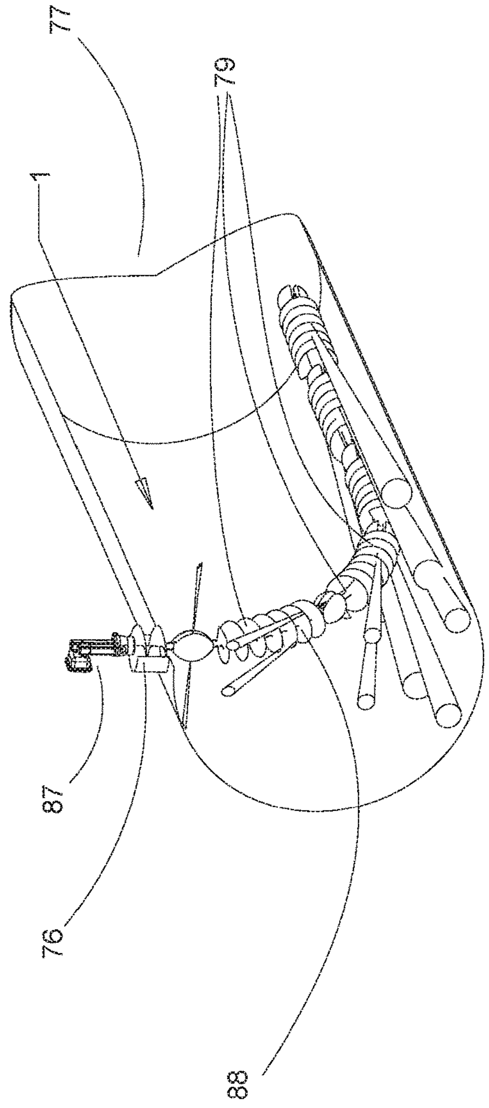
FIG. 13A is a schematic partial cross sectional perspective view of the exemplary container with the nozzles orientated at a different heading and pitch than shown in FIG. 12A.
Figure 13C:
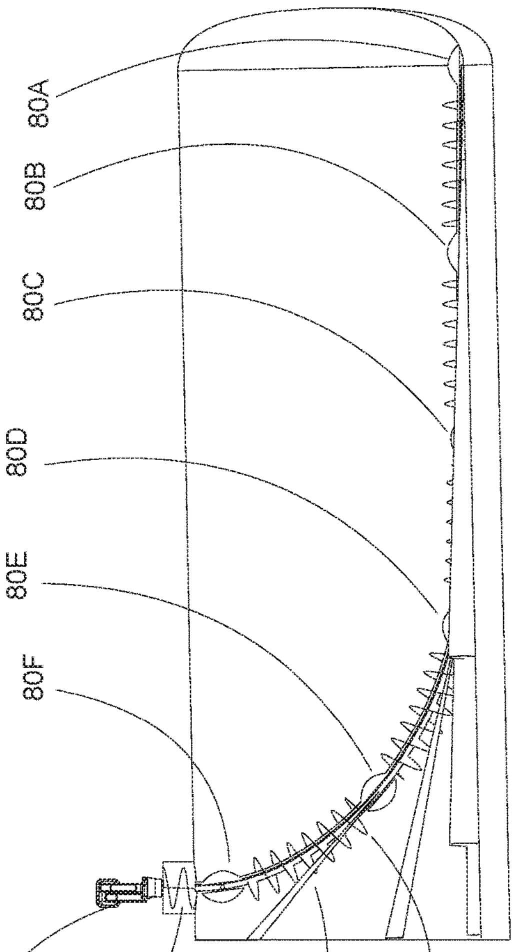
FIG. 13C is a schematic cross sectional side view of the exemplary container with the flexible system shown in FIG. 13A.
Figure 13B:
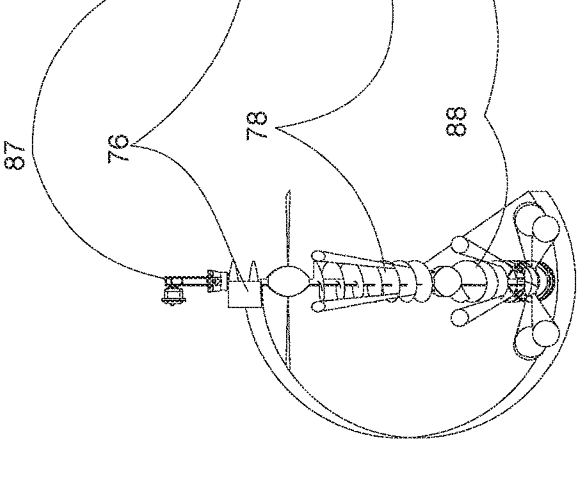
FIG. 13B is a schematic partial cross sectional end view of the exemplary container with the flexible system shown in FIG. 13A.

FIG. 13A is a schematic partial cross sectional perspective view of the exemplary container with the nozzles orientated at a different heading and pitch than shown in FIG. 12A. FIG. 13B is a schematic partial cross sectional end view of the exemplary container with the flexible system shown in FIG. 13A. FIG. 13C is a schematic cross sectional side view of the exemplary container with the flexible system shown in FIG. 13A. The system 1 in FIGS. 13A-13C represents the system 1 in FIGS. 12A-12C with a different nozzle direction. It is possible to use the streams 79 to self-propel the flexible mast along the container. The nozzles can be directed to flow in the opposite direction than the system is intended to move, in this instance away from the container end to move the system closer to the container end. Modules 80 that are outside the container can block fluid from flowing out of those modules and can remain dry until inserted into the container, if selectively controllable such as with the valves option described above. Similarly, the nozzles can be used to move the system in the opposite direction toward the opening 76, such as when the operations are completed in the container.

Figure 14A:
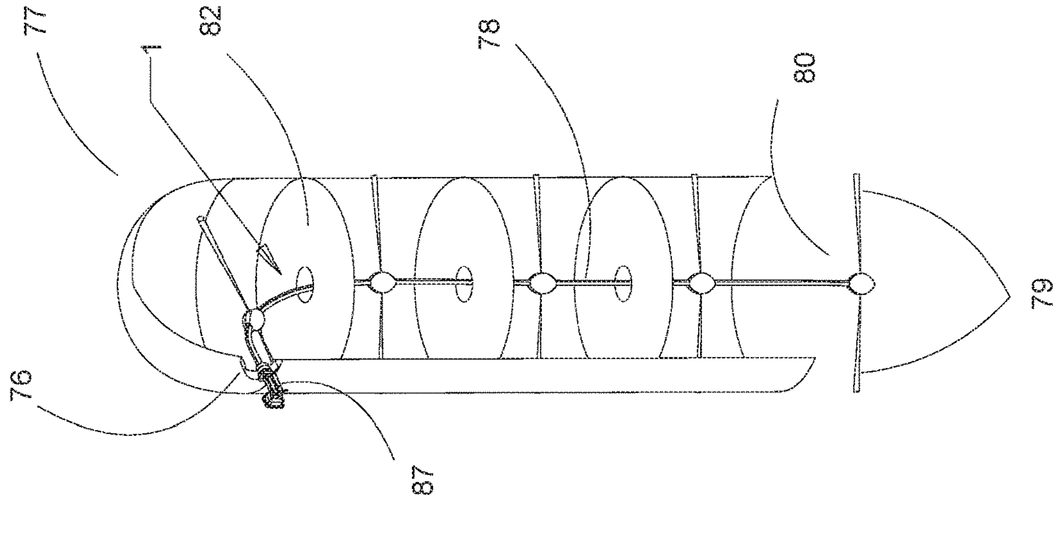
FIG. 14A is a schematic partial cross sectional perspective view of an exemplary container with a flexible system shown disposed therein similar to the embodiments shown in FIG. 11 and FIG. 12A.
Figure 14B:
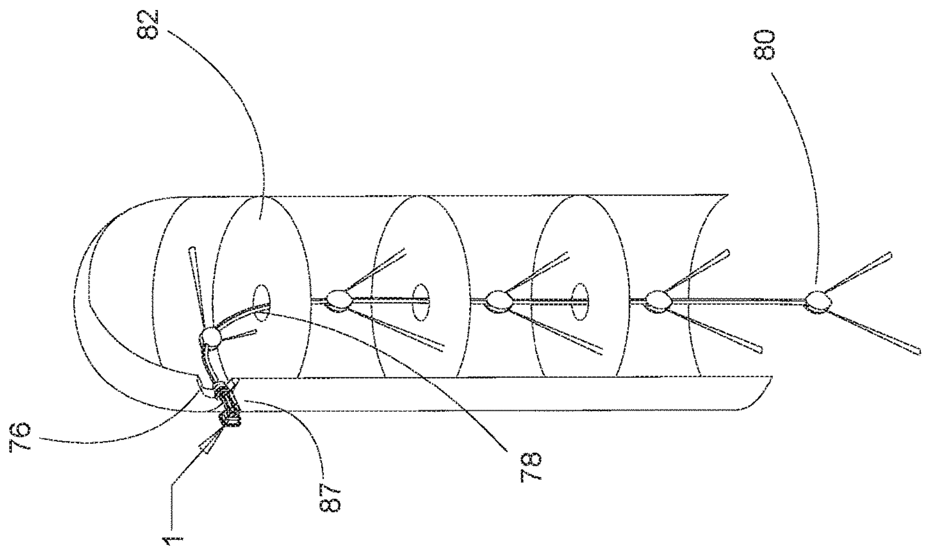
FIG. 14B is a schematic partial cross sectional perspective view of the exemplary container with the flexible system shown in FIG. 14A with the nozzles at a different heading and pitch.
Figure 14C:
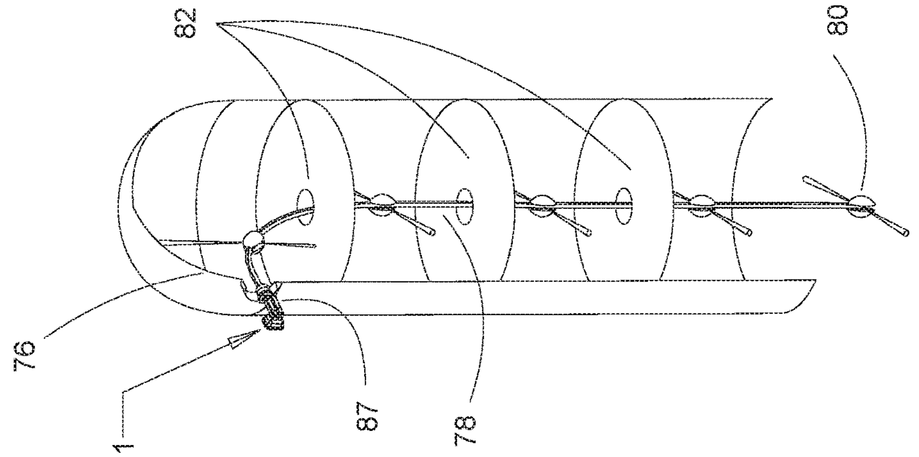
FIG. 14C is a schematic partial cross sectional perspective view of the exemplary container with the flexible system shown in FIG. 14B with the nozzles at a different heading and pitch.

FIG. 14A is a schematic partial cross sectional perspective view of an exemplary container with a flexible system shown disposed therein similar to the embodiments shown in FIG. 11 and FIG. 12A. FIG. 14B is a schematic partial cross sectional perspective view of the exemplary container with the flexible system shown in FIG. 14A with the nozzles at a different heading and pitch. FIG. 14C is a schematic partial cross sectional perspective view of the exemplary container with the flexible system shown in FIG. 14B with the nozzles at a different heading and pitch. A container 77 in this nonlimiting example can be a fracking tower in need of cleaning or other services from spraying a fluid through the system 1 in or on the container. The system 1 with the flexible mast shaft 78 and the modules 80 can be inserted through an access opening 76 of the container. As the flexible mast shaft 78 is inserted, the shaft can pass through an opening in one or more weir plates 82. The system 1 can be activated to clean or otherwise service the container as it is passing through the weir plates, in final position in the container after passing through the weir plates, when being removed from the container through the weir plates, or a combination thereof. In FIG. 14A, the heading angle of the flexible mast shaft 78 can be for example at 45 degrees and the pitch angle of the nozzle 53 can be for example at 90 degrees. In FIG. 14B, the heading angle of the flexible mast shaft 78 can be for example at 80 degrees and the pitch angle of the nozzle 53 can be for example at 120 degrees. In FIG. 14C, the heading angle of the flexible mast shaft 78 can be for example at 120 degrees and the pitch angle of the nozzle 53 can be for example at 30 degrees. When the system 1 is used with a controllable valve option, such as described in FIGS. 8A-8B, various modes of servicing the container can be used. For example, the system 1 can service the container from the top down by activating the module 80 in a first level of the container above a given weir plate while other levels may be inactive above (or below) the first level, servicing the first level, deactivating the module in the first level, and activating a module in a second level that is lower than the first level to service the second level, and so forth by progressively servicing at the desired levels. If cleaning, then waste can flow downward as each level is cleaned. By changing the heading, the container walls can be serviced around the perimeter. By changing the pitch, the top of the weir plates, bottom of the weir plates, and/or container sidewalls can be serviced at any given heading.

The nozzles with or without the described housings are shown coupled by the conduits that can be manipulated in a container at different positions. It is understood that the nozzles can be moved by mobile platforms, such as configurations with wheels, tractor treads, articulating linkages, propelled, or other types of drive devices that can carry at least one nozzle to desired locations. If a multiple nozzles are coupled together, then the mobile platform can include one or more units that can carry the plurality of nozzles to desired locations. The mobile platform can be controlled by hardwire control signals or by wireless signals.

Figure 15:
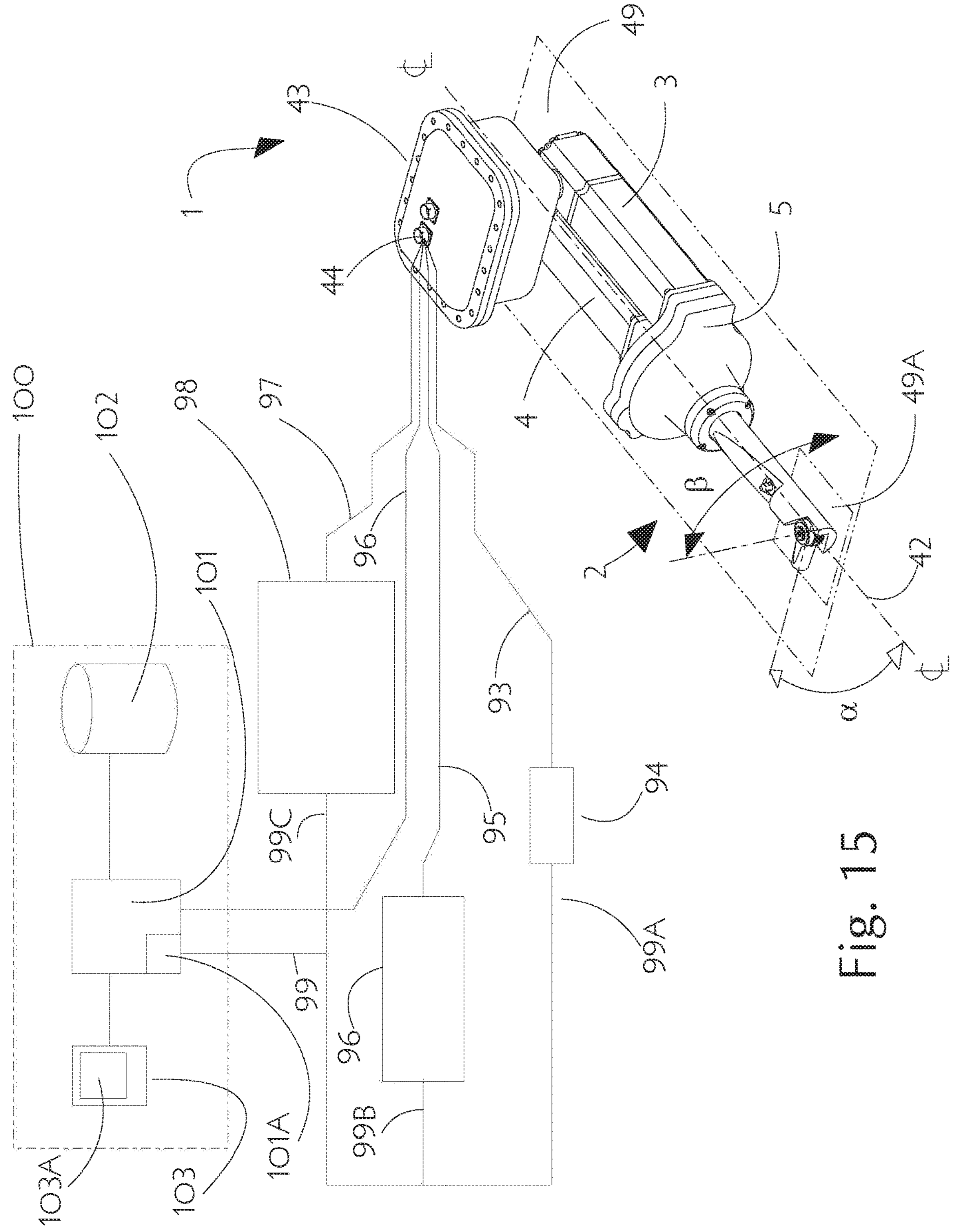
FIG. 15 is a schematic diagram of an exemplary control power and control assembly of components to operate the system.

FIG. 15 is a schematic diagram of an exemplary control power and control assembly of components to operate the system 1. The system can include various power sources for operation. For example, at least one pitch control power line 93 can be used to control a pitch control power supply 94 to one or more fluid actuated cylinders, described below, to provide pitch movement for the nozzle. At least one rotary control power line 95 can provide power from a rotary control power supply 96 to the articulating nozzle system 37 to provide heading movement for the nozzle. Further, at least one cleaning fluid line 97 can provide cleaning fluid from a cleaning fluid power supply 98 to the articulating nozzle system 37. The cleaning fluid is generally delivered at a high-pressure of several thousand pounds per square inch from the cleaning fluid power supply 98, which is generally an application-specific pump of such types as centrifugal, piston and airless pumps.

The system 1 can also include controls, such as onsite or remote controls to operate the system. Control lines 99A, 99B, and 99C (generally "99") for the power supplies 94, 96, 98, respectively, can couple control of the power supplies 94, 96, 98 to a control center 100. In turn, each of the power supplies can be coupled to a power line 93, 95, 97, respectively, and be directed to the particular portion of the applicable assembly, described in more detail below. In some embodiments, one or more of the controls can be disposed on the system 1, such as in the power housing 44. The control center 100 can generally include a controller 101A coupled with a processor 101, such as a standalone or networked computer or server, having volatile and/or non-volatile memory and associated software, firmware, and hardware. The processor 101 can be coupled to a database 102 having computer readable medium of one or more types for records, and other information as needed for the control, monitoring, and reporting of the operation and/or condition of the system 1. An input/output device 103, such as a display with a graphical user interface 103A (GUI) screen, can provide reporting and allow an operator to control and/or monitor the operation of the system 1. For example, an operator can use the interface 103A to enter a diameter and height of a vessel, and a program prompts the operator with a few questions designed to determine the optimal cleaning program along with suggested run times and consumables requirements. The operator can select the suggestions or enter other parameters to operate the system 1.

The combination of separately controlling the two axes of rotation and nozzle angle enables the system 1 to spray the surfaces of an object, such as a container, in a virtually infinite number of adjustable patterns such as spirals or zigzags, where each pattern can be engineered to create optimized program for the task. Multiple nozzles can be linked together to provide synchronized coverage across a large array, minimizing overlapping areas. The motion control capabilities allow the system 1 to target programmed areas of special need. In some embodiments, the system 1 can return to target areas between pattern changes. For example, each cycle can begin at the same point inside an enclosed volume for consistent precise application times. To assist in locating the positions of the two axes of rotation and nozzle angle, one or more sensors (not shown) that can monitor pressure, temperature, location, cleanliness or other desired parameters can be positioned on or in the system and coupled to the control center 100. The sensors can indicate the heading and pitch of the nozzle and/or mast assembly. The positional readings can be sent to the control center 100 as feedback through a feedback control line 104.

The control center 100 can also be located at a remote site. The controls can be set up in a customary manner using various types of remote interfaces between a remote site and a job site, including using networks such as LANs, WANs, and other types of Internet sites, such as FTP (File Transfer Protocol) sites, Telnet sites, wireless communications, and the like.

Figure 16:
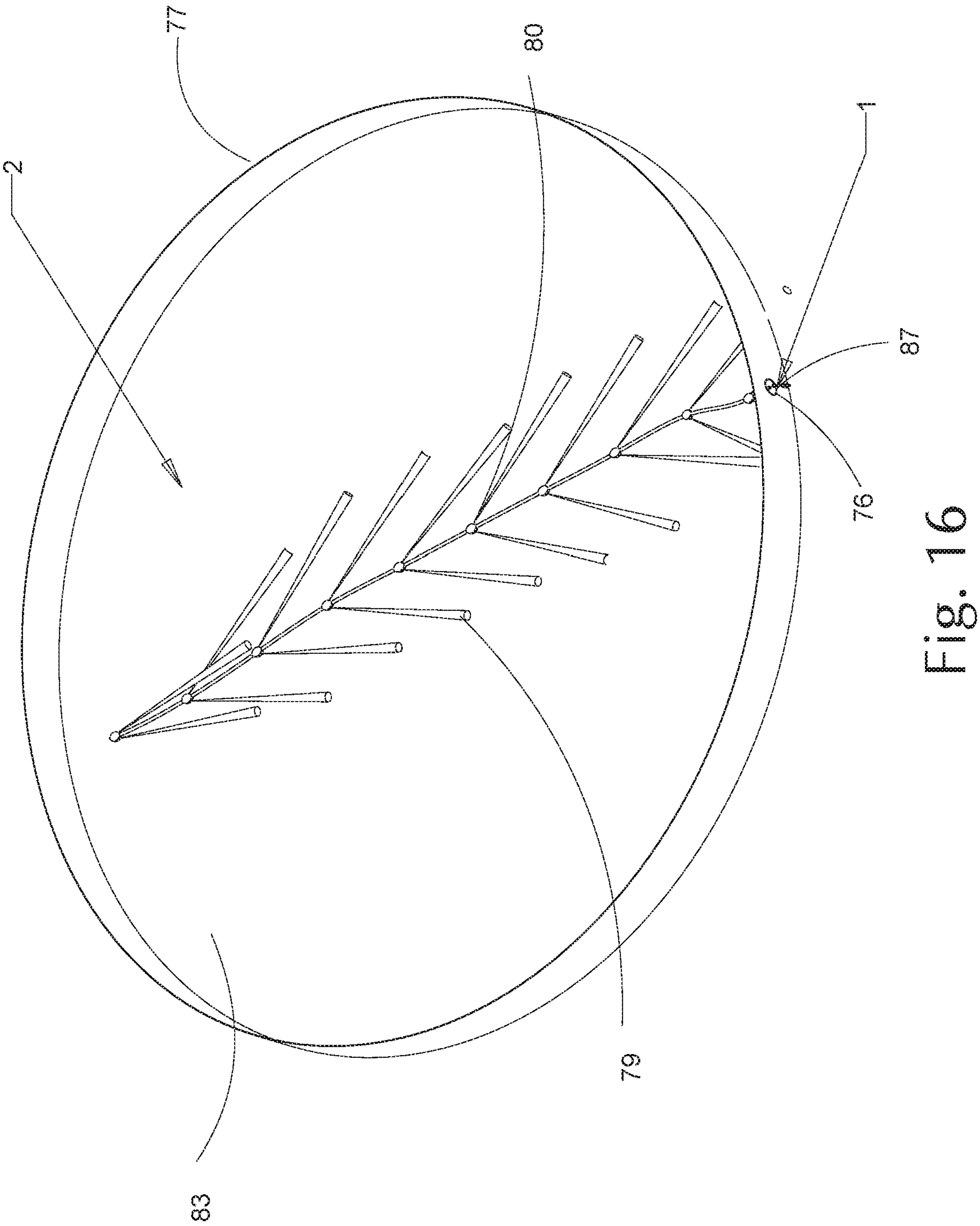
FIG. 16 is a schematic diagram of a low profile, wide body container with the spray system inserted therein having a plurality of modules with nozzles attached to a flexible mast shaft.

FIG. 16 is a schematic diagram of a low profile, wide body container with the spray system inserted therein having a plurality of modules with nozzles attached to a flexible mast shaft. In this embodiment, the dimensions of the container are larger than a spray pattern from the nozzles can reach. The spray system needs to move around the container. As described above, the spray system 1 can include a mast assembly 2 with plurality of modules 80 of controllable nozzles attached to a flexible mast shaft. The nozzles can be controlled for flow, pitch, and heading to create an imbalance to the mast assembly with the resulting force used to move the mast assembly along a surface, such as a floor of the container.

In at least one example of operation, the spray system 1 can be inserted into an access opening 76. As the mast assembly 2 is inserted into the opening 76, a particular module 80 entering the opening can be activated so that its nozzle(s) spray fluid generally toward the opening from an inside of the container. The resulting force can pull the mast assembly further into the container. As each module 80 enters the container through the opening 76, the module can also be activated in like manner, so that the mast assembly is pulled into the container.

Figure 17A:
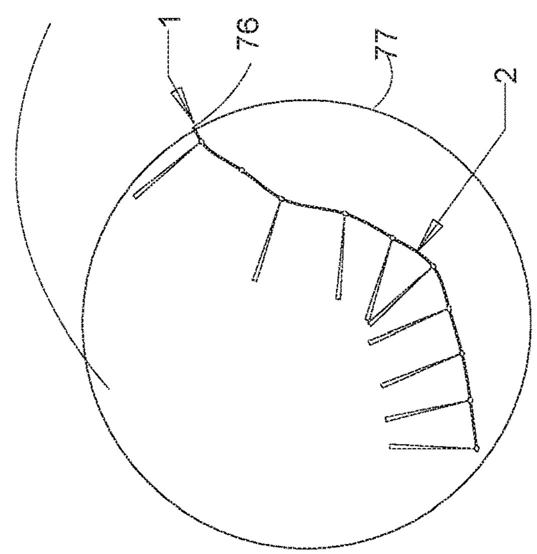
FIG. 17A is a schematic diagram of the container and the spray systems of FIG. 16 in a first position.
Figure 17B:
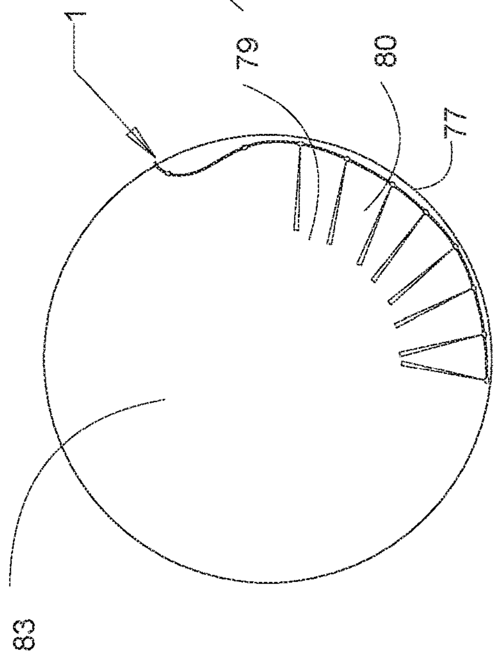
FIG. 17B is a schematic diagram of the container and the spray systems of FIG. 16 in a second position.
Figure 17C:
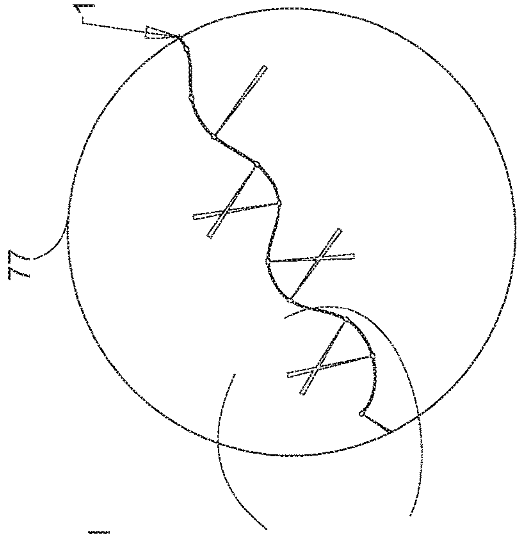
FIG. 17C is a schematic diagram of the container and the spray systems of FIG. 16 in a third position.
Figure 17D:
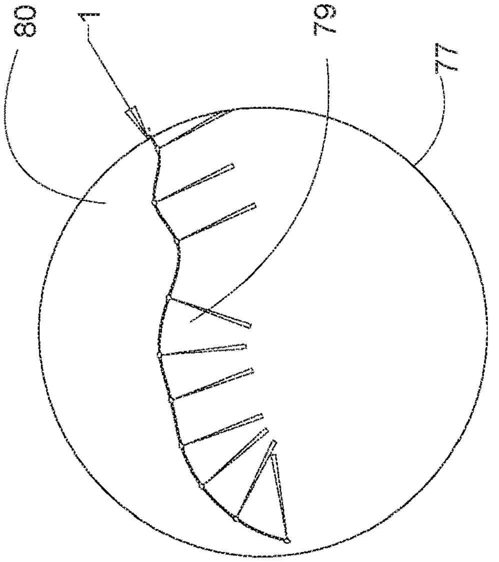
FIG. 17D is a schematic diagram of the container and the spray systems of FIG. 16 in a fourth position.
Figure 17E:
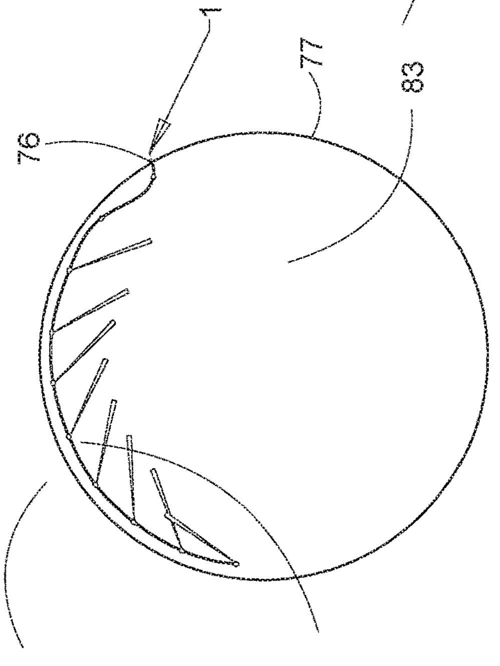
FIG. 17E is a schematic diagram of the container and the spray systems of FIG. 16 in a fifth position.
Figure 17F:
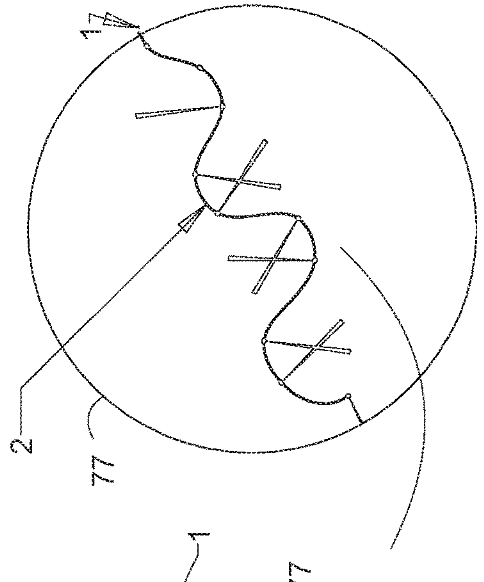
FIG. 17F is a schematic diagram of the container and the spray systems of FIG. 16 in a sixth position.

FIG. 17A is a schematic diagram of the container and the spray systems of FIG. 16 in a first position. FIG. 17B is a schematic diagram of the container and the spray systems of FIG. 16 in a second position. FIG. 17C is a schematic diagram of the container and the spray systems of FIG. 16 in a third position. FIG. 17D is a schematic diagram of the container and the spray systems of FIG. 16 in a fourth position. FIG. 17E is a schematic diagram of the container and the spray systems of FIG. 16 in a fifth position. FIG. 17F is a schematic diagram of the container and the spray systems of FIG. 16 in a sixth position. The various figures show at least one sequence of spraying the walls and other surfaces of the container 77 by moving the mast assembly 2 around the container. In FIG. 17A, the modules 80 with the nozzles can be activated in a direction to move the mast assembly 2 toward a wall of the container, as shown in FIG. 17B. At least some of the nozzles in the modules can be redirected to spray the container walls. As shown in FIG. 17C, the nozzles can be controlled and redirected to spray across the container. The modules 80 can be controlled to direct the nozzles to spray in a direction and force to move the mast assembly 2 across the container to another container wall, as shown in FIG. 17D resulting in the position of the mast assembly 2 shown in FIG. 17E. The spray system 1 can be further controlled in the spray patterns to move away from the container wall in FIG. 17E across the container to the position shown in FIG. 17F. The controlled flow and direction of the nozzles in the modules allow the nozzles to spray, and if applicable clean and push waste material into the extraction system, such as a sump drain or vacuum removal. By adding the brushes to the mast assembly as described above, the cleaning effectiveness can increase.

Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the word “comprise” or variations such as “comprises” or “comprising” should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms such as “coupled”, “coupling”, “coupler”, and like are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unity fashion. The coupling may occur in any direction, including rotationally.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The invention has been described in the context of preferred and other embodiments and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope or range of equivalent of the following claims.

What is claimed is:

1. A multi-axis rotary spray system, comprising:
- a heading drive;
- a pitch drive;
- a mast assembly coupled to the heading drive and the pitch drive, comprising:
  - a flexible mast shaft comprising a fluid conduit and a flexible pitch member;
  - a plurality of housings coupled to the flexible mast shaft at intervals along the mast shaft; and
  - a plurality of rotatable nozzles rotatably coupled to the plurality of housings and to the flexible pitch member;
- the heading drive rotating the mast assembly to control a heading of the nozzles, and the pitch driving moving the pitch member to control the pitch of the nozzles while the heading changes.

2. The system of claim 1, wherein the rotatable nozzles in a first housing are selectively controllable in flow relative to rotatable nozzles in a second housing while the heading changes.

3. The system of claim 1, wherein at least one of the rotatable nozzles in a first housing is selectively controllable in flow relative to another nozzle in the first housing.

4. The system of claim 1, wherein the plurality of rotatable nozzles are rotatable to independent pitch angles from each other.

* * * * *